United States Patent [19]

Bertolacini et al.

[11] 4,369,130
[45] Jan. 18, 1983

[54] COMPOSITION FOR REMOVING SULFUR OXIDES FROM A GAS

[75] Inventors: Ralph J. Bertolacini, Chesterton, Ind.; Eugene H. Hirschberg, Park Forest; Frank Modica, Downers Grove, both of Ill.

[73] Assignee: Standard Oil Company, Chicago, Ill.

[21] Appl. No.: 220,275

[22] Filed: Dec. 29, 1980

Related U.S. Application Data

[62] Division of Ser. No. 29,264, Apr. 11, 1979.

[51] Int. Cl.³ .............................................. B01J 29/06
[52] U.S. Cl. .......................... 252/455 Z; 208/120; 423/244
[58] Field of Search .............. 252/455 Z; 208/120; 423/244 R

[56] References Cited

U.S. PATENT DOCUMENTS

| | | | |
|---|---|---|---|
| 3,930,987 | 1/1976 | Grand | 208/111 |
| 4,071,436 | 1/1978 | Blanton, Jr. et al. | 208/120 |
| 4,153,534 | 5/1979 | Vasalos | 208/120 |
| 4,206,039 | 6/1980 | Vasalos | 208/120 |
| 4,221,677 | 9/1980 | Vasalos et al. | 252/455 Z |

*Primary Examiner*—Carl F. Dees
*Attorney, Agent, or Firm*—Richard A. Kretchmer; William T. McClain; William H. Magidson

[57] ABSTRACT

Sulfur oxides are removed from a gas by an absorbent comprising at least one inorganic oxide selected from the group consisting of the oxides of aluminum, magnesium, zinc, titanium, and calcium in association with at least one free or combined rare earth metal selected from the group consisting of lanthanum, cerium, praseodymium, samarium, and dysprosium, wherein the ratio by weight of inorganic oxide or oxides to rare earth metal or metals is from about 0.1 to about 30,000. Absorbed sulfur oxides are recovered as a sulfur-containing gas comprising hydrogen sulfide by contacting the spent absorbent with a hydrocarbon in the presence of a hydrocarbon cracking catalyst at a temperature from about 375° to about 900° C. The absorbent can be circulated through a fluidized catalytic cracking process together with the hydrocarbon cracking catalyst to reduce sulfur oxide emissions from the regeneration zone.

29 Claims, 6 Drawing Figures

ABSORPTION OF $SO_2$ BY MIXTURES OF CBZ-1 CATALYST WITH VARIOUS ADDITIVES AT 675° C.

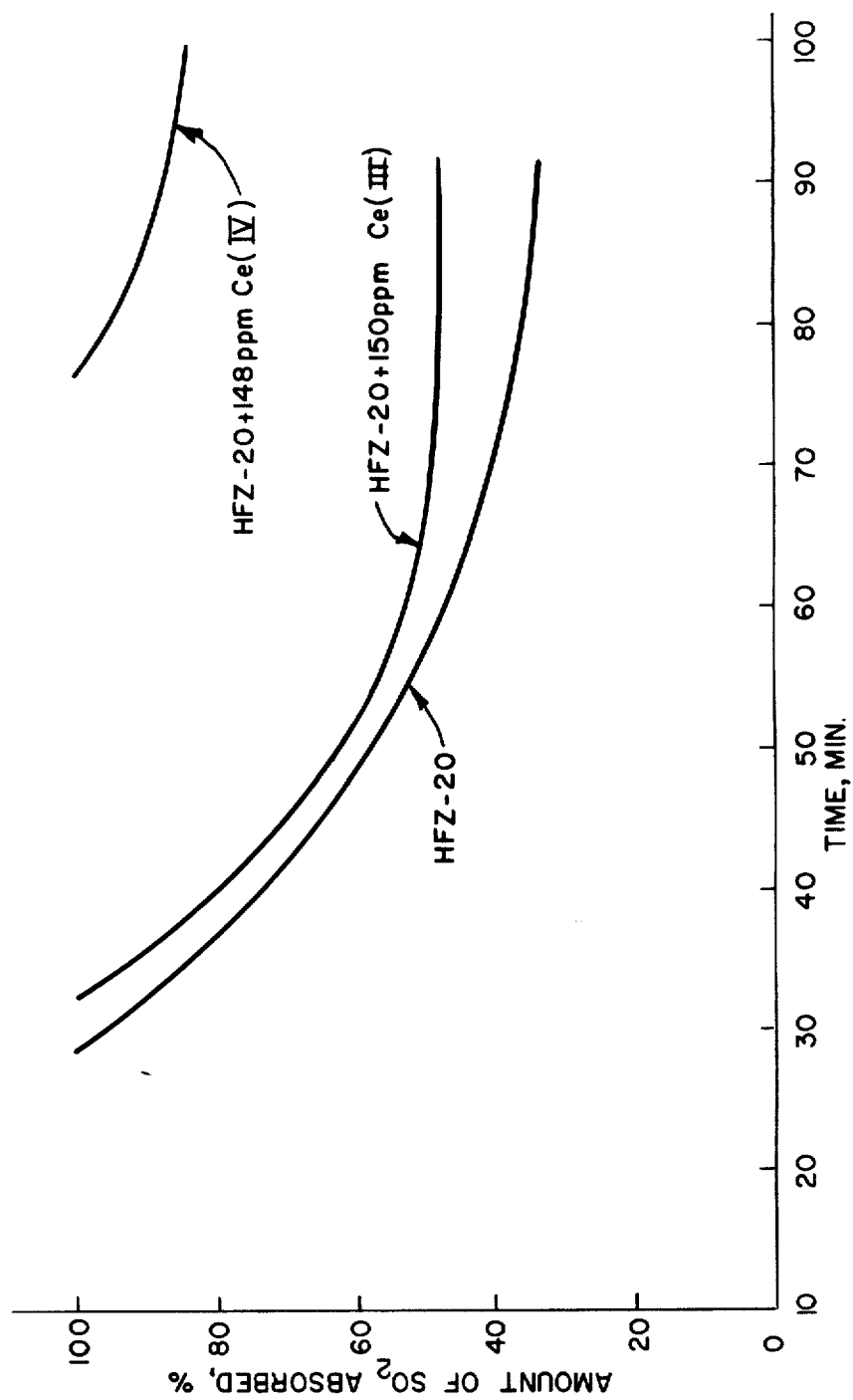

COMPOSITION FOR REMOVING SULFUR OXIDES FROM A GAS

This is a division of application Ser. No. 29,264, filed Apr. 11, 1979.

BACKGROUND OF THE INVENTION

1. Field of the Invention

This invention relates to a process for reducing the sulfur oxide content of a waste gas stream through the use of absorbents which can be reactivated for further absorption of sulfur oxides by contact with a hydrocarbon in the presence of a hydrocarbon cracking catalyst. More particularly, this invention relates to a method for reducing sulfur oxide emissions from the regenerator of a fluidized catalytic cracking unit.

2. Description of the Prior Art

A major industrial problem involves the development of efficient methods for reducing the concentration of air pollutants, such as sulfur oxides, in the waste gases which result from the processing and combustion of sulfur containing fuels. The discharge of these waste gas streams into the atmosphere is environmentally undesirable at the sulfur oxide concentrations which are frequently encountered in conventional operations. Such waste gas streams typically result, for example, from operations such as the combustion of sulfur containing fossil fuels for the generation of heat and power, the regeneration of catalysts employed in the refining of hydrocarbon feedstocks which contain organic sulfur compounds, and the operation of Claus-type sulfur recovery units.

Two fundamental approaches have been suggested for the removal of sulfur oxides from a waste gas. One approach involves scrubbing the waste gas with an inexpensive alkaline material, such as lime or limestone, which reacts chemically with the sulfur oxides to give a nonvolatile product which is discarded. Unfortunately, this approach requires a large and continual supply of the alkaline scrubbing material, and the resulting reaction products can create a solid waste disposal problem of substantial magnitude.

The second principal approach to the control of sulfur oxide emissions involves the use of sulfur oxide absorbents which can be regenerated either thermally or chemically. The process of the subject invention is representative of this second approach.

U.S. Pat. No. 4,001,375 to J. M. Longo discloses a process for removal of sulfur oxides from a gas which involves absorbing the sulfur oxides with cerium oxide followed by regeneration of the spent cerium oxide by reaction with hydrogen gas. This regeneration step results in the formation of a gas which contains a 1:1 ratio of hydrogen sulfide to sulfur dioxide and which may be fed directly to a Claus-type sulfur recovery unit for conversion into elemental sulfur. It is further disclosed that the cerium oxide may be supported on an inert support such as alumina, silica and magnesia. The patent does not, however, suggest that the spent cerium oxide could be regenerated by contact with a hydrocarbon in the presence of a hydrocarbon cracking catalyst. In addition, the patent fails to suggest that the nature of the support could be significant or that cerium can be combined with alumina and/or magnesia to effect an absorption of sulfur oxides which is enhanced as a consequence of synergism.

An article entitled "Selection of Metal Oxides for Removing $SO_2$ from Flue Gas" by Lowell et al. in Ind. Eng. Chem. Process Des. Develop., Vol. 10, No. 3, 1971, is addressed to a theoretical evaluation of the possible use of various metal oxides to absorb sulfur dioxide from a flue gas. The authors evaluate 47 metal oxides from which they select a group of 16 potentially useful single oxide absorbents, which includes the oxides of aluminum, cerium and titanium. Magnesium oxide was eliminated from the group of potentially useful oxides because of an unfavorable sulfate decomposition temperature. This evaluation is based on the assumption that the absorbents would be regenerated thermally and does not consider the possibility of regeneration under reducing conditions. Consequently, there is no suggestion that any of these metal oxides could be regenerated by contact with a hydrocarbon in the presence of a hydrocarbon cracking catalyst.

The cyclic, fluidized, catalytic cracking of heavy petroleum fractions is one of the major refining operations involved in the conversion of crude petroleum oils to valuable products such as the fuels utilized in internal combustion engines. Such a process involves the cracking of a petroleum feedstock in a reaction zone through contact with fluidized solid particles of a cracking catalyst. Catalyst which is substantially deactivated by nonvolatile coke deposits is then separated from the reaction zone effluent and stripped of volatile deposits in a stripping zone. The stripped catalyst particles are separated from the stripping zone effluent, regenerated in a regeneration zone by combustion of the coke with an oxygen containing gas, and the regenerated catalyst particles are returned to the reaction zone. In the application of this process to sulfur-containing feedstocks, catalyst is deactivated through the formation of sulfur-containing deposits of coke. In conventional processes, the combustion of this sulfur-containing coke results in the release of substantial amounts of sulfur oxides to the atmosphere. U.S. Pat. No. 3,835,031, to R. J. Bertolacini et al. discloses a method for the reduction of these sulfur oxide emissions through the use of a cracking catalyst comprising a zeolite in a silica-alumina matrix which has from about 0.25 to about 5.0 weight percent of a Group IIA metal or mixture of Group IIA metals distributed over the surface of the matrix and present as an oxide or oxides. The metal oxide or oxides react with sulfur oxides in the regeneration zone to form nonvolatile inorganic sulfur compounds. These nonvolatile inorganic sulfur compounds are then converted to the metal oxide or oxides and hydrogen sulfide upon exposure to hydrocarbons and steam in the reaction and stripping zones of the process unit. The resulting hydrogen sulfide is disposed of in equipment conventionally associated with a fluid catalytic cracking unit. Similarly, Belgian Pat. No. 849,637 also is directed to a process wherein a Group IIA metal or metals is circulated through a cyclic fluidized catalytic cracking process in order to reduce the sulfur oxide emissions resulting from regeneration of deactivated catalyst. The disclosures of these patents do not, however, suggest the desirability of combining a rare earth metal with the oxide of a Group IIA metal such as magnesium oxide or calcium oxide.

Belgian Pat. No. 849,636 and its counterpart, U.S. patent application Ser. No. 748,556, disclose a process similar to that set forth in U.S. Pat. No. 3,835,031, which involves the removal of sulfur oxides from the regeneration zone flue gas of a cyclic, fluidized, catalytic cracking unit through the use of a zeolite-type cracking catalyst in combination with a regenerable metallic reactant which absorbs sulfur oxides in the regeneration zone and releases the absorbed sulfur oxides as hydrogen sulfide in the reaction and stripping zones of the process unit. It is taught that a suitable metallic reactant comprises one or more members selected from the group consisting of sodium, scandium, titanium, chromium, molybdenum, manganese, cobalt, nickel, antimony, copper, zinc, cadmium, the rare earth metals and lead, in free or combined form. In addition, it is disclosed that the metallic reactant may be supported by an amorphous cracking catalyst or a solid which is substantially inert to the cracking reaction. Silica, alumina and mixtures of silica and alumina are mentioned as suitable supports. There is no specific teaching, however, of the desirability of combining any particular rare earth metals with inorganic oxides selected from the group consisting of the oxides of aluminum, magnesium, zinc, titanium and calcium. The disclosure contains no suggestion that such a combination would afford a synergistically enhanced reduction of regenerator sulfur oxide emissions.

Belgian Pat. No. 849,635 and its counterpart, U.S. patent application Ser. No. 748,555 are also directed to a process of the type set forth in U.S. Pat. No. 3,835,031 and Belgian Pat. No. 849,636, and teaches that an improved reduction of regeneration zone sulfur oxide emissions can be achieved by combining a sulfur oxide absorbent with a metallic promoter. The metallic promoter comprises at least one free or combined element selected from the group consisting of ruthenium, rhodium, palladium, osmium, iridium, platinum, vanadium, tungsten, uranium, zirconium, rhenium and silver. The sulfur oxide absorbent comprises at least one free or combined element which is selected from the group consisting of sodium, magnesium, calcium, strontium, barium, scandium, titanium, chromium, molybdenum, manganese, cobalt, nickel, antimony, copper, zinc, cadmium, lead and the rare earth metals. Although the metallic promoter enhances the ability of the absorbent to absorb sulfur oxides in the regeneration zone of a cyclic, fluidized, catalytic cracking unit, the more active promoters such as platinum and palladium also promote the formation of nitrogen oxides and the combustion of carbon monoxide in the regeneration zone. Since the discharge of nitrogen oxides into the atmosphere is environmentally undesirable, the use of these promoters has the effect of substituting one form of undesirable emission for another. The ability of these promoters to enhance the combustion of carbon monoxide in the regenerator is also undesirable in those situations wherein the regenerator vessel and associated equipment, such as cyclones and flue gas lines, are constructed of metals such as carbon steel which may not be able to tolerate the increased regeneration temperatures which can result from enhanced carbon monoxide combustion.

U.S. Pat. No. 4,146,463 to H. D. Radford et al. discloses a process wherein a waste gas containing sulfur oxides and/or carbon monoxide is conveyed to the regeneration zone of a cyclic, fluidized, catalytic cracking unit wherein it is contacted with a metal oxide which reacts with the sulfur oxides to form nonvolatile inorganic sulfur compounds. This patent teaches that suitable metal oxides include those selected from the group consisting of the oxides of sodium, the Group IIA metals, scandium, titanium, chromium, iron, molybdenum, manganese, cobalt, nickel, antimony, copper, zinc, cadmium, lead and the rare earth metals. In addition, the patent teaches that the metal oxide may be incorporated into or deposited onto a suitable support such as silica, alumina and mixtures of silica and alumina. The teaching of this patent fails to suggest the combination of specific rare earth metals with one or more inorganic oxides selected from the group consisting of the oxides of aluminum, magnesium, zinc, titanium and calcium. In addition, there is no suggestion that such a combination could produce improved results as a consequence of synergism.

U.S. Pat. No. 4,071,436 to W. A. Blanton et al. teaches that alumina and/or magnesia can be used to absorb sulfur oxides from a gas and the absorbed sulfur oxides can be removed by treatment with a hydrocarbon. It is further disclosed that sulfur oxide emissions from the regenerator of a cyclic, fluidized, catalytic cracking unit can be reduced by combining alumina and/or magnesia with the hydrocarbon cracking catalyst. Similarly, U.S. Pat. Nos. 4,115,249 (W. A. Blanton et al.), 4,115,250 (R. L. Flanders et al.) and 4,115,251 (R. L. Flanders et al.) teach the utility of alumina or alumina to absorb sulfur oxides in the regenerator of a cyclic, fluidized, catalytic cracking unit. The disclosures of these patents do not, however, mention the rare earth metals or suggest that the combination of specific rare earth metals with alumina and/or magnesia could give improved results.

U.S. Pat. No. 3,899,444 to R. E. Stephens is directed to the preparation of a catalyst support which consists of an inert substrate or core which is coated with an alumina containing from about 1 to about 45 weight percent, based on the alumina, of a rare earth metal oxide which is uniformly distributed throughout the alumina coating. It is disclosed that the inert substrate may include such refractory materials as zirconia, zinc oxide, alumina-magnesia, calcium aluminate, synthetic and natural zeolites among many others. Similarly, U.S. Pat. No. 4,062,810 to W. Vogt et al. discloses compositions comprising cerium oxide on an aluminum oxide support.

U.S. Pat. No. 3,823,092 to E. M. Gladrow describes the treatment of a zeolite-type hydrocarbon cracking catalyst with a dilute solution containing cerium cations or a mixture of rare earth cations having a substantial amount of cerium in order to improve the regeneration rate of the catalyst. The resulting catalyst contains between about 0.5 and 4.0 percent of cerium oxide and it is further disclosed that the catalyst matrix may contain from 5 to 30% alumina. Similarly, U.S. Pat. No. 3,930,987 to H. S. Grand describes a hydrocarbon cracking catalyst comprising a composite of a crystalline aluminosilicate carrying rare earth metal cations dispersed in an inorganic oxide matrix wherein at least 50 weight percent of the inorganic oxide is silica and/or alumina, and the rare earth metal content of the matrix is from 1 to 6 percent expressed as $RE_2O_3$. Also, U.S. Pat. No. 4,137,151 to S. M. Csicsery discloses a composition comprising lanthanum or a lanthanum compound in association with a porous inorganic oxide which may be the matrix of a zeolite-type cracking catalyst. These patents contain no mention of sulfur oxides and fail to suggest that the combination of specific rare earth metals with specific metal oxides, such as alumina, could afford an improved sulfur oxide absorbent which can be regenerated by contact with a hydrocarbon in the presence of a hydrocarbon cracking catalyst.

Alumina is a component of many different catalyst compositions which have been developed for use in the cracking of hydrocarbons. A synthetically prepared amorphous cracking catalyst, which received wide commerical use shortly after the development of fluidized bed cracking techniques, contained about 13% alumina and 87% silica. Subsequently, amorphous silica-alumina catalysts were developed and used commercially which contained about 25 to 30% alumina. In addition, silica-magnesia catalysts were also developed and used commercially. These silica-magnesia catalysts contained about 20% magnesia in addition to about 15% alumina and about 65% silica. At the present time, most if not all commercial cracking catalysts contain a crystalline aluminosilicate or zeolite which is distributed throughout an amorphous silica-alumina matrix.

SUMMARY OF THE INVENTION

This invention is directed to a process for removing sulfur oxides from a gas which comprises: (a) absorbing sulfur oxides from the gas with an absorbent which comprises at least one inorganic oxide selected from the group consisting of the oxides of aluminum, magnesium, zinc, titanium and calcium in association with at least one free or combined rare earth metal selected from the group consisting of lanthanum, cerium, praseodymium, samarium and dysprosium, at a temperature in the range from about 100° to about 900° C., wherein the ratio by weight of inorganic oxide or oxides to rare earth metal or metals is from about 1.0 to about 1,000, and (b) removing said absorbed sulfur oxides from the absorbent as a sulfur-containing gas which comprises hydrogen sulfide by contacting said absorbent with a hydrocarbon in the presence of a hydrocarbon cracking catalyst at a temperature in the range from about 375° to about 900° C.

Another embodiment of the invention is a process for the cyclic, fluidized, catalytic cracking of a hydrocarbon feedstock containing from about 0.2 to about 6.0 weight percent sulfur as organic sulfur compounds wherein (i) said feedstock is subjected to cracking in a reaction zone through contact with a particulate cracking catalyst at a temperature in the range from 430° to 700° C.; (ii) cracking catalyst, which is deactivated by sulfur-containing coke deposits, is separated from reaction zone effluent and passes to a stripping zone wherein volatile deposits are removed from said catalyst by contact with a stripping gas comprising steam at a temperature in the range from 430° to 700° C.; (iii) stripped catalyst is separated from stripping zone effluent and passes to a catalyst regeneration zone and non-stripped, sulfur-containing coke deposits are removed from the stripped catalyst by burning with an oxygen-containing regeneration gas at a temperature in the range from 565° to 790° C., thereby forming sulfur oxides; and (iv) resulting catalyst is separated from regeneration zone effluent gas and recycled to the reaction zone; and wherein emissions of sulfur oxides in the regeneration zone effluent gas are reduced by the method which comprises: (a) absorbing sulfur oxides in said regeneration zone with fluidizable particulate solids which comprise at least one inorganic oxide selected from the group consisting of the oxides of aluminum, magnesium, zinc, titanium and calcium in association with at least one free or combined rare earth metal selected from the group consisting of lanthanum, cerium, praseodymium, samarium and dysprosium, wherein said rare earth metal or metals and inorganic oxide or oxides are present in the particulate solids in sufficient amount to effect the absorption of at least about 50 weight percent of the sulfur oxides produced by the burning of sulfur-containing coke deposits in the regeneration zone and the ratio by weight of inorganic oxide or oxides to rare earth metal or metals is from about 1.0 to about 30,000; and (b) removing said absorbed sulfur oxides from the fluidizable particulate solids as a sulfur-containing gas which comprises hydrogen sulfide by contacting said particulate solids with the hydrocarbon feedstock in said reaction zone.

Another embodiment of the invention is a process for the cyclic, fluidized, catalytic cracking of a hydrocarbon feedstock containing organic sulfur compounds wherein (i) said feedstock is subjected to cracking in a reaction zone through contact with a particulate cracking catalyst at a temperature in the range from 430° to 700° C.; (ii) cracking catalyst, which is deactivated by sulfur-containing coke deposits, is separated from reaction zone effluent and passes to a stripping zone wherein volatile deposits are removed from said catalyst by contact with a stripping gas comprising steam at a temperature in the range from 430° to 700° C.; (iii) stripped catalyst is separated from stripping zone effluent and passes to a catalyst regeneration zone and non-stripped, sulfur-containing coke deposits are removed from the stripped catalyst by burning with an oxygen-containing regeneration gas at a temperature in the range from 565° to 790° C., thereby forming sulfur oxides; and (iv) resulting catalyst is separated from regeneration zone effluent gas and recycled to the reaction zone; and wherein emissions of sulfur oxides in the regeneration zone effluent gas are reduced by the method which comprises: (a) absorbing sulfur oxides in said regeneration zone with a fluidizable particulate solid other than said cracking catalyst which comprises at least one inorganic oxide selected from the group consisting of the oxides of aluminum, magnesium, zinc, titanium and calcium in association with at least one free or combined rare earth metal selected from the group consisting of lanthanum, cerium, praseodymium, samarium and dysprosium, wherein the ratio by weight of inorganic oxide or oxides to rare earth metal or metals is from about 1.0 to about 1,000 and said particulate solid is physically admixed with said cracking catalyst; and (b) removing said absorbed sulfur oxides from the fluidizable particulate solid as a sulfur-containing gas which comprises hydrogen sulfide by contacting said particulate solid with the hydrocarbon feedstock in said reaction zone.

In another embodiment, the present invention relates to a composition of matter prepared by the steps comprising: (a) impregnating a particulate solid cracking catalyst comprising from about 0.5 to about 50 weight percent of a crystalline aluminosilicate zeolite distributed throughout a matrix consisting essentially of from about 40 to about 100 weight percent of alumina and from about 0 to about 60 weight percent of silica with at least one rare earth metal compound selected from the group consisting of the compounds of lanthanum, cerium, praseodymium, samarium, and dysprosium, wherein the amount of said rare earth metal compound or compounds is sufficient to add from about 0.004 to about 10 weight percent of rare earth metal or metals, calculated as the metal or metals, to said catalyst particles; and (b) calcining said impregnated catalyst particles at a temperature between about 200° and about 820° C.

In a further embodiment, the present invention relates to a composition of matter comprising a particulate physical mixture of (a) a particulate solid cracking catalyst for cracking hydrocarbons comprising a crystalline aluminosilicate zeolite distributed throughout a matrix; and (b) a particulate solid other than said cracking catalyst comprising at least one inorganic oxide selected from the group consisting of the oxides of aluminum, magnesium, zinc, titanium and calcium in association with at least one free or combined rare earth metal selected from the group consisting of lanthanum, cerium, praseodymium, samarium and dysprosium, wherein the particulate solid other than cracking catalyst contains at least about 40 weight percent of the inorganic oxide or oxides, the ratio by weight of inorganic oxide or oxides to rare earth metal or metals is from about 1.0 to about 1000, and said particulate solid other than cracking catalyst comprises from about 0.1 to about 50 weight percent of said particulate physical mixture.

In a still further embodiment, the present invention relates to a composition of matter comprising a particulate physical mixture of (a) a particulate solid cracking catalyst for cracking hydrocarbons comprising a crystalline aluminosilicate zeolite distributed throughout a matrix, wherein said catalyst comprises from about 50 to about 99.9 weight percent of the particulate physical mixture; (b) a first particulate solid other than said cracking catalyst comprising at least about 50 weight percent of one or more inorganic oxides selected from the group consisting of the oxides of aluminum, magnesium, zinc, titanium and calcium; and (c) a second particulate solid other than said cracking catalyst comprising at least one free or combined rare earth metal selected from the group consisting of lanthanum, cerium, praseodymium, samarium and dysprosium, wherein the ratio by weight of the inorganic oxide or oxides of said first particulate solid to the rare earth metal or metals of said second particulate solid is from about 1.0 to about 1,000.

It has been discovered that the rare earth metal or metals and the inorganic oxide or oxides of this invention act together in a synergistic manner to afford a more efficient absorption of sulfur oxides from a gas than is possible if they are used separately. Accordingly, it is an object of this invention to provide an improved composition of matter for use in absorbing sulfur oxides from a gas.

Another object of this invention is to provide an improved process for removing sulfur oxides from a gas.

Another object of this invention is to provide an improved method for reducing sulfur oxide emissions from the regenerator of a cyclic, fluidized, catalytic cracking unit which does not significantly alter the yield of hydrocarbon products from the cracking process.

A further object of this invention is to provide a highly active sulfur oxide absorbent for use in a cyclic, fluidized, catalytic cracking unit which does not significantly promote the combustion of carbon monoxide within the regeneration zone.

A still further object of this invention is to provide a highly active sulfur oxide absorbent for use in a cyclic, fluidized, catalytic cracking unit which does not significantly promote the formation of nitrogen oxides within the regeneration zone.

Other objectives, aspects and advantages of the invention will be readily apparent from the following detailed description and claims.

BRIEF DESCRIPTION OF THE DRAWINGS

FIG. 6 of the drawings illustrates the ability of cerium to enhance the ability of a high alumina cracking catalyst to absorb sulfur dioxide when deposited on the catalyst by impregnation as Ce(III) or Ce(IV).

DETAILED DESCRIPTION OF THE INVENTION

Figure 1:
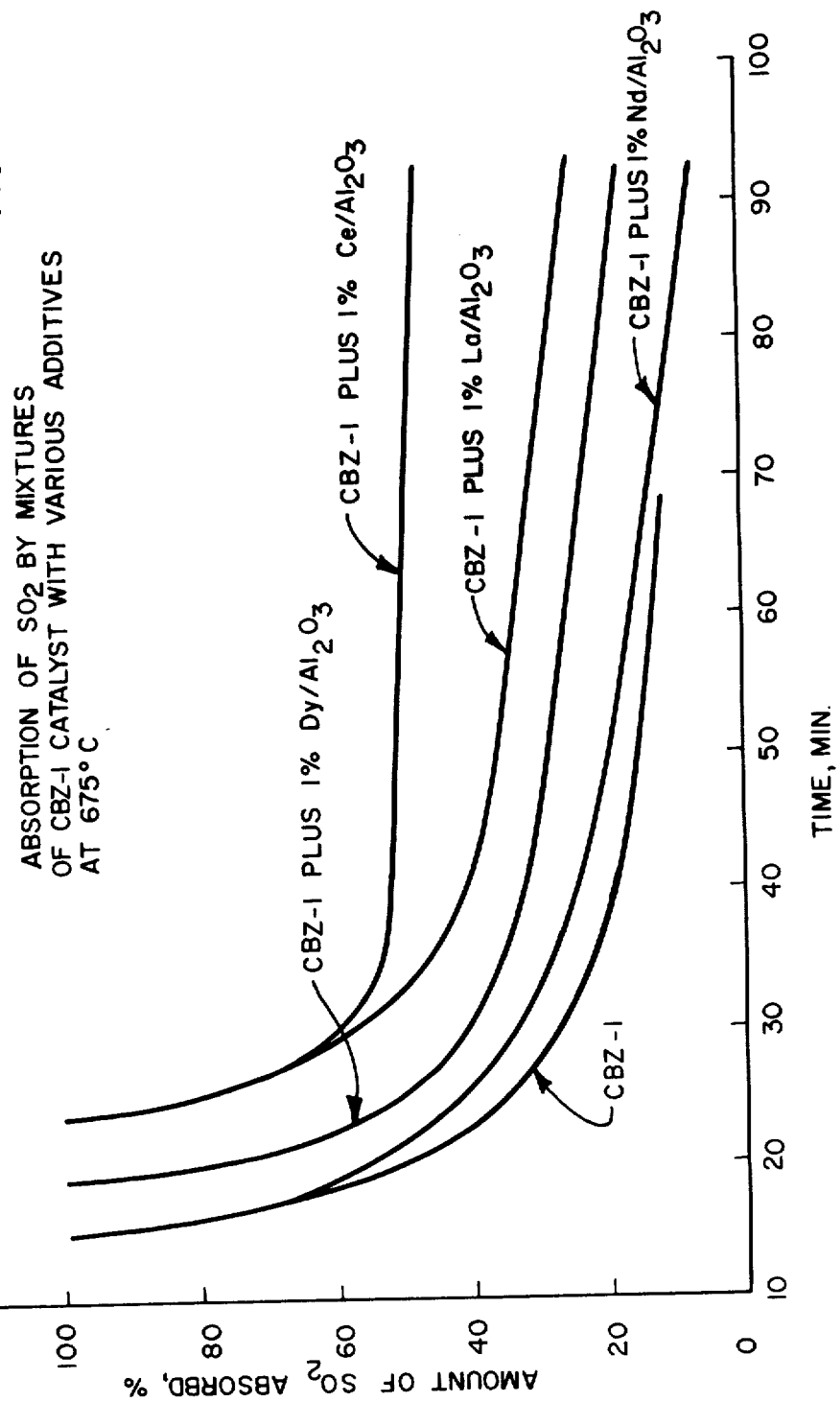
FIGS. 1-5 of the drawings illustrate the ability of 1% by weight of various additives to improve the ability of CBZ-1 cracking catalyst to absorb sulfur dioxide.

It has been discovered that an association of at least one free or combined rare earth metal selected from the group consisting of lanthanum, cerium, praseodymium, samarium and dysprosium with at least one inorganic oxide selected from the group consisting of the oxides of aluminum, magnesium, zinc, titanium and calcium is a highly efficient absorbent for sulfur oxides, which can be regenerated by contact with a hydrocarbon in the presence of a hydrocarbon cracking catalyst. The rare earth metal or metals and the inorganic oxide or oxides act together in a synergistic manner to absorb sulfur oxides from a gas more efficiently than would be expected from their individual abilities to absorb sulfur oxides. Although the precise mechanism by which this synergism occurs is unclear, it is believed that the rare earth metal serves both to absorb the sulfur oxides and to assist in the transfer of sulfur oxides to the inorganic oxide. This transfer of sulfur oxides to the inorganic oxide may result from an ability of the rare earth metal to catalyze the conversion of sulfur dioxide to sulfur trioxide which is more easily absorbed by the inorganic oxide. The rare earth metal does not, however, significantly enhance the combustion of carbon monoxide which may also be present in the gas. Consequently, the process of this invention can be used to reduce sulfur oxide emissions from the regenerator of a fluid catalytic cracking unit wherein the regenerator vessel and/or associated process equipment, such as cyclones, cannot tolerate the increased temperatures which would result from an enhanced combustion of carbon monoxide. In addition, the rare earth metal, unlike metals such as platinum and palladium, does not significantly enhance the formation of nitrogen oxides in the regenerator of a fluidized catalytic cracking unit.

In the practice of this invention, at least one free or combined rare earth metal is employed which is selected from the group consisting of lanthanum, cerium, praseodymium, samarium and dysprosium. Preferably, at least one free or combined metal selected from the group consisting of lanthanum and cerium is employed. Lanthanum and cerium are the most effective rare earth metals for sulfur oxide absorption in accordance with this invention, and cerium is generally more active than lanthanum.

The rare earth metals are those elements which have atomic numbers from 57 to 71. These elements commonly occur together in mineral deposits, and in those deposits which contain sufficient rare earth metals for commercial exploitation, the total rare earth metal content generally consists of about 50% cerium, 20-30% lanthanum, 15-20% neodymium, 5-6% praseodymium and less than about 5% of the remaining rare earth elements. In view of the similar chemical properties of the various rare earth elements, it is relatively difficult to separate them or their compounds from each other in pure form. For the practice of this invention, however, it is unnecessary to effect such a separation, and a preferred embodiment of the invention involves the use of a mixture of rare earth metals or compounds thereof of the type which is obtained from natural sources prior to any substantial separation of individual rare earth metals or compounds thereof. Additionally, it is relatively simple to separate a cerium concentrate and a lanthanum concentrate from mixtures of rare earth metals, and these concentrates contain a major portion of cerium and lanthanum respectively. A further embodiment of this invention involves the use of a mixture of rare earth metals or compounds thereof such as is found in either of such concentrates. Cerium and lanthanum are highly preferred rare earth metals for use in the practice of this invention, and the suitability of a cerium or lanthanum concentrate or a mixture of rare earth metals as initially obtained from natural deposits, is believed to be primarily a reflection of the cerium and-/or lanthanum content of these materials. Although purified rare earth metals or compounds thereof are highly suitable for use in the practice of this invention, such purification serves to increase the cost of the necessary materials.

The oxides of the rare earth metals are particularly effective in association with the inorganic oxide or oxides of this invention for absorbing sulfur oxides from a gas. Consequently, it is preferable to utilize the rare earth metal or metals in the form of the oxide or oxides. Although the rare earth metal oxides are preferred, it is sufficient for the practice of this invention that at least one suitable rare earth metal or any compound thereof be employed.

In the practice of this invention, at least one inorganic oxide is employed which is selected from the group consisting of the oxides of aluminum, magnesium, zinc, titanium, and calcium, and preferably at least one inorganic oxide selected from the group consisting of alumina and magnesium oxide is employed. Magnesium oxide is generally somewhat more efficient in absorbing sulfur oxides than is alumina but does not release absorbed sulfur oxides as readily as alumina upon contact with a hydrocarbon in the presence of a cracking catalyst. In addition, when fluidized solids are employed, particles comprising large amounts of magnesium oxide frequently have poor attrition properties relative to particles comprising large amounts of alumina. In view of the desirable attrition and sulfur oxide releasing properties of alumina, the inorganic oxide most preferably comprises alumina. Although the use of any form of alumina is contemplated for use in the practice of this invention, gamma-alumina and eta-alumina are preferred because of their usually large surface area.

A preferred embodiment of the invention involves the use of a mixture of inorganic oxides which comprises at least about 50 percent by weight of alumina. Mixtures of alumina with magnesium oxide and of alumina with zinc oxide are particularly suitable, wherein the weight ratio of alumina to magnesium oxide or zinc oxide is desirably from about 1.0 to about 500, and preferably from about 2.0 to about 100. In these embodiments, the desirable attrition and sulfur oxide releasing properties of alumina are combined with the excellent sulfur oxide absorption properties of the other metal oxides, particularly of magnesium oxide or zinc oxide.

The inorganic oxides of this invention generally afford the best results when they have a large surface area. This surface area is desirably greater than about 10 square meters per gram, preferably greater than about 50 square meters per gram and ideally greater than about 100 square meters per gram. Similarly, the rare earth metal or metals generally afford the best results when they have a large surface area exposed to the sulfur oxide containing gas as, for example, when the rare earth metal or metals are deposited on a support having a large surface area. Such a support will have a surface area which is desirably in excess of about 10 square meters per gram, preferably greater than about 50 square meters per gram and ideally greater than about 100 square meters per gram. The larger surface areas are most desirable because of a more efficient contacting of the sulfur oxide containing gas with the solid.

The ratio of inorganic oxide or oxides to rare earth metal or metals, calculated as the metal or metals, is desirably from about 0.1 to about 30,000, more desirably from about 1.0 to about 30,000, preferably from about 1.0 to about 1,000, and more preferably from about 2.0 to about 100, and ideally from about 3.0 to about 20. Decreasing the ratio of inorganic oxide or oxides to rare earth metal or metals generally affords an improved sulfur oxide absorption until a ratio of about 3.0 is reached. Smaller ratios than about 3.0 are not generally undesirable, but do not usually afford significant further improvement in sulfur oxide absorption properties. In addition, these smaller ratios require larger amounts of the rare earth metal or metals which will generally be more expensive than the inorganic oxide or oxides.

Suitable hydrocarbon cracking catalysts for use in the practice of this invention include all high-activity solid catalysts which are stable under the required conditions. Suitable catalysts include those of the amorphous silica-alumina type having an alumina content of about 10 to about 30 weight percent. Catalysts of the silica-magnesia type are also suitable which have a magnesia content of about 20 weight percent. Preferred catalysts include those of the zeolite-type which comprise from about 0.5 to about 50 weight percent and preferably from about 1 to about 30 weight percent of a crystalline aluminosilicate component distributed throughout a porous matrix. Zeolite type cracking catalysts are preferred because of their thermal stability and high catalytic activity.

The crystalline aluminosilicate or zeolite component of the zeolite-type cracking catalyst can be of any type or combination of types, natural or synthetic, which is known to be useful in catalyzing the cracking of hydrocarbons. Suitable zeolites include both naturally occurring and synthetic aluminosilicate materials such as faujasite, chabazite, mordenite, Zeolite X (U.S. Pat. No. 2,882,244), Zeolite Y (U.S. Pat. No. 3,130,007) and ultrastable large-pore zeolites (U.S. Pat. Nos. 3,293,192 and 3,449,070). The crystalline aluminosilicates having a faujasite-type crystal structure are particularly suitable and include natural faujasite, Zeolite X and Zeolite Y. These zeolites are usually prepared or occur naturally in the sodium form. The presence of this sodium is undesirable, however, since the sodium zeolites have a low stability under hydrocarbon cracking conditions. Consequently, for use in this invention the sodium content of the zeolite is ordinarily reduced to the smallest possible value, generally less than about 1.0 weight percent and preferably below about 0.3 weight percent through ion exchange with hydrogen ions, hydrogen-precursors such as ammonium ion, or polyvalent metal cations including calcium, magnesium, strontium, barium and the rare earth metals such as cerium, lanthanum, neodymium and their mixtures. Suitable zeolites are able to maintain their pore structure under the high temperature conditions of catalyst manufacture, hydrocarbon processing and catalyst regeneration. These materials have a uniform pore structure of exceedingly small size, the cross-section diameter of the pores being in the range from about 4 to about 20 angstroms, preferably from about 8 to about 15 angstroms.

The matrix of the zeolite-type cracking catalyst is a porous refractory material within which the zeolite component is dispersed. Suitable matrix materials can be either synthetic or naturally occurring and include, but are not limited to, silica, alumina, magnesia, boria, bauxite, titania, natural and treated clays, kieselguhr, diatomaceous earth, kaolin and mullite. Mixtures of two or more of these materials are also suitable. Particularly suitable matrix materials comprise mixtures of silica and alumina, mixtures of silica with alumina and magnesia, and also mixtures of silica and alumina in combination with natural clays and clay-like materials. Mixtures of silica and alumina are preferred, however, and contain preferably from about 10 to about 65 weight percent of alumina mixed with from about 35 to about 90 weight percent of silica, and more preferably from about 25 to about 65 weight percent of alumina mixed with from about 35 to about 75 weight percent of silica.

In the practice of this invention, the rare earth metal or metals, which are associated with one or more suitable inorganic oxides, are preferably used in a form which does not involve chemical incorporation within a zeolite. Consequently, the rare earth metal or metals of this invention for use in the absorption of sulfur oxides are preferably not incorporated into a zeolite, for example by ion-exchange techniques, and are in addition to any such rare earth metal or metals which may be so incorporated in a zeolite. Such ion-exchanged rare earth metal or metals are not detrimental to the practice of this invention, but this form of rear earth metal is relatively inactive with respect to the absorption of sulfur oxides.

In the practice of this invention, the rare earth metal or metals and inorganic oxide or oxides can be combined in any suitable manner and can be additionally combined with the hydrocarbon cracking catalyst. These materials, for example, can be combined and shaped into pellets or extrudates of any desired shape. In a highly preferred embodiment, the rare earth metal or metals, the inorganic oxide or oxides, and the hydrocarbon cracking catalyst are employed in the form of particulate fluidizable solids. In this embodiment, the particles should be sufficiently strong that they are not subject to excessive attrition and degradation during fluidization. The average size of the solid particles will be desirably in the range from about 20 microns or less to about 150 microns, and preferably less than about 50 microns. The use of fluidized solids provides a highly efficient technique for contacting a gas with a solid or solids as is required in the practice of the process of this invention. Consequently, the use of fluidized solids affords a very efficient method of contacting the rare earth metal or metals and inorganic oxide or oxides of this invention with a gas which contains sulfur oxides. Similarly, the use of fluidized solids also provides an efficient method of contacting the spent rare earth metal-inorganic oxide absorbent of this invention with a hydrocarbon in the presence of a cracking catalyst to remove the absorbed sulfur oxides.

When particulate solids are used in the practice of this invention, the particles of cracking catalyst can contain both the rare earth metal or metals and inorganic oxide or oxides. Alternatively, the particles of cracking catalyst can contain the rare earth metal of metals and be physically mixed with a separate particulate solid which comprises the inorganic oxide or oxides. As a further alternative, the particles of cracking catalyst can contain the inorganic oxide or oxides and be physically mixed with a separate particulate solid which comprises the rare earth metal or metals. In addition, a physical mixture of three different particulate solids can also be employed wherein one particulate solid comprises the cracking catalyst, the rare earth metal or metals comprise the second particulate solid, and the inorganic oxide or oxides comprise the third particulate solid. It will, of course, be appreciated that combinations of these four different alternatives are also possible.

The inorganic oxide or oxides of this invention can comprise a portion of a cracking catalyst as, for example, in the case of a silica-alumina or silica-magnesia catalyst. Also, the inorganic oxide or oxides of this invention can comprise at least a portion of the matrix of a zeolite-type cracking catalyst. A particularly preferred embodiment of this invention comprises the use of alumina as the inorganic oxide which is provided in the form of a zeolite-type cracking catalyst having alumina in its matrix. The alumina content of such a matrix is desirably from about 10 to about 100 weight perecent, preferably from about 40 to about 100 weight percent, more preferably from about 60 to about 100 weight percent, and ideally from about 70 to about 100 weight percent. The use of a zeolite-type cracking catalyst having a high alumina matrix, for example in excess of about 40 weight percent, provides a highly convenient manner in which to provide the inorganic oxide of this invention. As the alumina content of the matrix increases, the ability of the cracking catalyst to absorb sulfur oxides in accordance with this invention also increases.

The inorganic oxide or oxides and/or rare earth metal or metals of this invention can be in the form of a fluidizable powder which is admixed with a particulate cracking catalyst. Illustrative of such powders are alumina, magnesia, titania, zinc oxide, calcium oxide, cerium oxide, lanthanum oxide and mixed rare earth oxides comprising cerium and/or lanthanum.

The rare earth metal or metals of this invention can be incorporated into or deposited onto a suitable support. Suitable supports include, but are not limited to, amorphous cracking catalysts, zeolite-type cracking catalysts, silica, alumina, mixtures of silica and alumina, magnesia, mixtures of silica and magnesia, mixtures of alumina and magnesia, mixtures of alumina and magnesia with silica, titania, zinc oxide, calcium oxide, natural and treated clays, kieselguhr, diatomaceous earth, kaolin and mullite. Such support preferably comprises at least one of the inorganic oxides of this invention. Desirably, the support is porous and has a surface area, including the area of the pores open to the surface, of at least about 10, preferably at least about 50, and most preferably at least about 100 square meters per gram. Large surface areas are desirable because of a more efficient contacting of the sulfur oxide containing gas with the solid.

Similarly, the inorganic oxide or oxides of this invention can be incorporated into or deposited onto a suitable support. This support should also be porous and desirably has a surface area of at least about 10, preferably at least about 50, and most preferably at least about 100 square meters per gram. Large surface areas are desirable because of a more efficient contacting of the sulfur oxide containing gas with the solid. Suitable supports include, but are not limited to, silica, natural and treated clays, kieselguhr, diatomaceous earth, kaolin and mullite. In addition, one of the inorganic oxides of this invention, for example alumina, can be used as a support for one or more other inorganic oxides.

The rare earth metal or metals and/or inorganic oxide or oxides of this invention can be combined with a support either during or after preparation of the support. One method consists of impregnating a suitable support with an aqueous or organic solution or dispersion of a compound or compounds of the rare earth metal or metals and/or metal or metals of the inorganic oxide or oxides. The impregnation can be carried out in any manner which will not destroy the structure of the support. After drying, the composite can be calcined to afford the supported rare earth metal or metals and/or inorganic oxide or oxides of the invention. Preferably, nitrates, carbonates and salts of organic acids such as acetates are employed in the impregnating solution or dispersion, particularly if a cracking catalyst is used as the support, since the residue from the thermal decomposition of these salts is relatively innocuous to the activity of a hydrocarbon cracking catalyst. The halogen and sulfate salts can also be used, but the by-products produced during thermal degradation of these salts may be deleterious to the activity of the cracking catalyst. Consequently, the halogen and sulfate salts are used, preferably, in combination with supports which are substantially inert to the cracking of hydrocarbons.

The rare earth metal or metals and/or inorganic oxide or oxides can be incorporated with a support precursor, such as silica gel, silica-alumina gel or alumina gel, prior to spray drying or other physical formation process. Subsequent drying and, if desired, calcination then affords the supported rare earth metal or metals and/or inorganic oxide or oxides. In those instances wherein a cracking catalyst is employed as a support, the rare earth metal or metals and/or the inorganic oxide or oxides may be incorporated by coprecipitation of the rare earth metal or metals and/or metal or metals of the inorganic oxide or oxides with catalyst precursors, for example as the metal hydroxides, followed by addition of the zeolite component if any in particulate form, followed by drying and, if desired, calcination.

The gas from which sulfur oxides are removed according to the process of the present invention can contain, in addition to sulfur oxides, such gases as nitrogen, steam, carbon dioxide, carbon monoxide, oxygen, nitrogen oxides and rare gases such as argon. Minor amounts of other gases may also be present. Suitable sulfur oxide containing gases include, but are not limited to, flue gases, tail gases and stack gases. Ordinarily, gases such as nitrogen, carbon dioxide and steam will represent a major portion of the gas. The process of this invention is particularly effective for removing sulfur oxides from a gas which has a low concentration of sulfur oxides, for example, less than about 0.5 volume percent. The process of this invention is also effective, however, for removing sulfur oxides from a gas which has a high concentration of sulfur oxides, for example, greater than about 0.5 volume percent and up to about 10 volume percent. The process of this invention permits removal from the sulfur oxide containing gas of desirably at least about 50%, preferably at least about 80% and ideally more than about 90% of the sulfur oxides.

The gas from which sulfur oxides are removed according to the process of this invention need not contain molecular oxygen, but in a preferred embodiment desirably contains an amount of molecular oxygen which is in excess of the stoichiometric amount required to convert any sulfur dioxide present to sulfur trioxide. The excess of oxygen can range from about 0.001 to about 10,000 times the stoichiometric amount which is required to convert any sulfur dioxide to sulfur trioxide. Ordinarily, however, the excess need not be greater than from about 0.001 to about 100 times the stoichiometrically required amount. The excess of molecular oxygen need not be large, but the ability of the rare earth metal-inorganic oxide absorbent of this invention to absorb sulfur dioxide is improved as the amount of excess molecular oxygen increases. Although the reason for this effect by molecular oxygen is uncertain, it is believed that increased concentrations of oxygen promote the conversion of sulfur dioxide to sulfur trioxide in accordance with the law of mass action. It is further believed that this sulfur trioxide is more easily absorbed by the rare earth metal-inorganic oxide absorbent than is the sulfur dioxide. The molecular oxygen can either be inherently present in the sulfur oxide containing gas or can be added thereto.

The absorption of sulfur oxides with the rare earth metal-inorganic oxide absorbent of this invention is desirably carried out at a temperature below about 900° C., preferably at a temperature from about 100° to about 900° C. and most preferably at a temperature from about 300° to about 800° C.

The removal of absorbed sulfur oxides from the rare earth metal-inorganic oxide absorbent of this invention is accomplished by contacting the spent absorbent with a hydrocarbon in the presence of a hydrocarbon cracking catalyst at an elevated temperature. This temperature is desirably from about 375° to about 900° C., preferably from about 430° to about 700° C. and most preferably from about 450° to about 650° C.

The temperature at which the sulfur oxides are absorbed by and removed from the rare earth metal-inorganic oxide absorbent must, of course, be lower than that which will cause substantial thermal deactivation of the cracking catalyst. Consequently, acid treated clays cannot ordinarily be used at temperatures much above about 650° C., whereas many zeolite-type cracking catalysts can be used at temperatures of 750° C. and above. By way of example, hydrocarbon cracking catalysts containing ultrastable zeolites are stable at temperatures in excess of 1000° C.

Any hydrocarbon can be used to remove the absorbed sulfur oxides from the rare earth metal-inorganic oxide of this invention so long as it can be cracked by the cracking catalyst at the temperatures employed. Suitable hydrocarbons include, but are not limited to, methane, natural gas, natural gas liquids, naphtha, light gas oils, heavy gas oils, wide-cut gas oils, vacuum gas oils, decanted oils and reduced crude oils as well as hydrocarbon fractions derived from shale oils, coal liquefaction and the like. Such hydrocarbons can be employed either singly or in any desired combination.

In a preferred embodiment of the invention, the rare earth metal-inorganic oxide absorbent is contacted with added steam while it is simultaneously contacted with a hydrocarbon in the presence of the hydrocarbon cracking catalyst. In an alternative embodiment, the rare earth metal-inorganic oxide absorbent is contacted with steam at a temperature desirably from about 100° to about 900° C. and preferably from about 430° to about 700° C. subsequent to the treatment with a hydrocarbon in the presence of a hydrocarbon cracking catalyst. Such treatment with steam is not necessary, but generally results in an improved removal of absorbed sulfur oxides. The amount of steam employed is desirably equal to or greater on a mole basis than the amount of sulfur oxides absorbed by the rare earth metal-inorganic oxide absorbent. The amount of added steam can range, on a mole basis, from about 1.0 to about 10,000, preferably from about 1.0 to about 1,000, and more preferably from about 1.0 to about 100 times the amount of sulfur oxides absorbed by the absorbent.

Although the invention disclosed herein is not to be so limited, it is believed that chemical reaction occurs between the rare earth metal-inorganic oxide absorbent and the sulfur oxides which results in the formation of nonvolatile inorganic sulfur compounds, such as sulfites and sulfates. This chemical reaction is reversible and can be summarized in a simplified manner by the following equations:

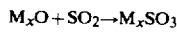

$$M_xO + SO_2 \rightarrow M_xSO_3$$

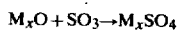

$$M_xO + SO_3 \rightarrow M_xSO_4$$

where x is the ratio of the oxidation state of the oxide ion to the oxidation state of a metal component M of the rare earth metal-inorganic oxide absorbent when combined with oxygen. At very high temperatures, these sulfites and sulfates can undergo partial decomposition to liberate the original sulfur oxides and absorbent. As a consequence of this reversal of the sulfur oxide absorption at high temperature, the absorption of sulfur oxides is desirably effected at a temperature below about 900° C. and preferably below about 800° C.

The precise mechanism by which absorbed sulfur oxides are removed from the rare earth metal-inorganic oxide absorbent of this invention is unknown, but it is believed that the combination of hydrocarbon and hydrocarbon cracking catalyst at elevated temperatures provides a reducing environment which effects a conversion of absorbed sulfur oxides to hydrogen sulfide while simultaneously reactivating the absorbent for further absorption of sulfur oxides. Although the invention is not to be so limited, it is believed that the removal of absorbed sulfur oxides can be summarized in a simplified manner by the following equations:

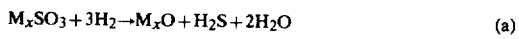

$$M_xSO_3 + 3H_2 \rightarrow M_xO + H_2S + 2H_2O \quad (a)$$

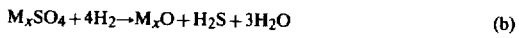

$$M_xSO_4 + 4H_2 \rightarrow M_xO + H_2S + 3H_2O \quad (b)$$

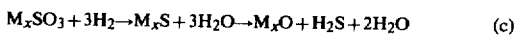

$$M_xSO_3 + 3H_2 \rightarrow M_xS + 3H_2O \rightarrow M_xO + H_2S + 2H_2O \quad (c)$$

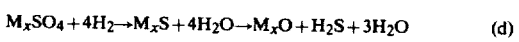

$$M_xSO_4 + 4H_2 \rightarrow M_xS + 4H_2O \rightarrow M_xO + H_2S + 3H_2O \quad (d)$$

where x is the ratio of the oxidation state of the oxide ion to the oxidation state of a metal component M of the rare earth metal-inorganic oxide absorbent when combined with oxygen. The removal of absorbed sulfur oxides from the absorbent is generally improved by contacting the absorbent with added steam either simultaneously with or subsequent to treatment with a hydrocarbon in the presence of a cracking catalyst. It is believed that at least some metal sulfide is formed according to equations (c) and (d) above and that added steam serves to promote the conversion of these metal sulfides to hydrogen sulfide with simultaneous reactivation of the absorbent.

The hydrogen sulfide which is produced during the removal of absorbed sulfur oxides from the rare earth metal-inorganic oxide absorbent can be converted to elemental sulfur by any of the conventional techniques which are well known to the art as, for example, in a Claus unit. Cracked hydrocarbon products which are produced during removal of absorbed sulfur oxides from the absorbent of this invention, after substantial separation of hydrogen sulfide, can be recycled to extinction for further use in removing absorbed sulfur oxides. Alternatively, these cracked hydrocarbon products can be burned directly as a fuel or can be fractionated by conventional techniques to separate more valuable products of lower molecular weight than the initial hydrocarbon employed.

A highly preferred embodiment of this invention comprises its use to reduce sulfur oxide emissions from catalyst regeneration in a cyclic, fluidized, catalytic cracking process. In this embodiment, the rare earth metal-inorganic oxide absorbent is circulated through the fluidized catalytic cracking process in association with the particulate cracking catalyst.

Catalytic cracking of heavy mineral oil fractions is one of the major refining operations employed in the conversion of crude oils to desirable fuel products such as high-octane gasoline fuels used in spark-ignited internal combustion engines. In fluidized catalytic cracking processes, high molecular weight hydrocarbon liquids or vapors are contacted with hot, finely-divided, solid catalyst particles, either in a fluidized bed reactor or in an elongated riser reactor, and the catalyst-hydrocarbon mixture is maintained at an elevated temperature in a fluidized or dispersed state for a period of time sufficient to effect the desired degree of cracking to low molecular weight hydrocarbons of the kind typically present in motor gasoline and distillate fuels.

Conversion of a selected hydrocarbon feedstock in a fluidized catalytic cracking process is effected by contact with a cracking catalyst, preferably in one or more fluidized transfer line reactors, at conversion temperature and at a fluidizing velocity which limits the conversion time to not more than about ten seconds. Conversion temperatures are desirably in the range from about 430° to about 700° C. and preferably from about 450° to about 650° C. Reactor effluent, comprising hydrocarbon vapors and cracking catalyst containing a deactivating quantity of carbonaceous material or coke, is then transferred to a separation zone. Hydrocarbon vapors are then separated from spent cracking catalyst and the catalyst stripped of volatile deposits before regeneration. The stripping zone can be suitably maintained at a temperature in the range from about 430° to about 700° C., preferably from about 450° to about 650° C., and most preferably from about 465° to about 595° C. The preferred stripping gas is steam, although inert gases, such as nitrogen or flue gases, or mixtures of steam with inert gases can also be used. The stripping gas is introduced at a pressure in the range from about 0.7 to about 2.5 kilograms per square centimeter above atmospheric pressure, and in an amount which is sufficient to effect substantially complete removal of volatile deposits from deactivated cracking catalyst. When steam is employed as the stripping gas, the weight ratio of stripping steam to cracking catalyst is in the range from about 0.0005 to about 0.025 and preferably in the range from about 0.0015 to about 0.0125.

In the catalytic cracking of hydrocarbons, some non-volatile carbonaceous material or coke is deposited on the catalyst particles. Coke comprises highly condensed aromatic hydrocarbons which generally contain a minor amount of hydrogen, generally from about 4 to about 10 weight percent of hydrogen. When the hydrocarbon feedstock contains organic sulfur compounds, the coke also contains sulfur. As coke builds up on the cracking catalyst, the activity of the catalyst for cracking and the selectivity of the catalyst for producing gasoline blending stocks diminishes. The catalyst can, however, recover a major portion of its original capabilities by removal of most of the coke therefrom in a suitable regeneration process.

In a fluidized catalytic cracking process, stripped deactivated cracking catalyst is regenerated by burning the coke deposits from the catalyst surface with a molecular oxygen containing regeneration gas, such as air, in a regeneration zone or regenerator. This burning results in the formation of combustion products such as sulfur oxides, carbon monoxide, carbon dioxide and steam. The oxygen containing regeneration gas can contain diluent gases such as nitrogen, steam, carbon dioxide, recycled regenerator effluent and the like. The molecular oxygen concentration of the regeneration gas is ordinarily from about 2 to about 30 volume percent and preferably from about 5 to about 25 volume percent. Since air is conveniently employed as a source of molecular oxygen, a major portion of the inert gas can be nitrogen. The regeneration zone temperatures are ordinarily in the range from about 565° to about 790° C. and are preferably in the range from about 620° to about 735° C. When air is used as the regeneration gas, it enters the bottom of the regenerator from a blower or compressor and a fluidizing velocity in the range from about 0.05 to about 1.5 meters per second and preferably from about 0.15 to about 0.90 meters per second is maintained in the regenerator. Regenerated catalyst is then recycled to the transfer line reactor for further use in the conversion of hydrocarbon feedstock.

The method of this invention can be used in a fluidized catalytic cracking process with wide variation in the cracking conditions. In the usual case where a gas oil feedstock is employed, the throughput ratio (TPR), or volume ratio of total feed to fresh feed, can vary from about 1.0 to about 3.0. Conversion level can vary from about 40% to about 100% where conversion is here defined as the percentage reduction of hydrocarbons boiling above 221° C. at atmospheric pressure by formation of lighter materials or coke. The weight ratio of catalyst to oil in the reactor can vary within the range from about 2 to about 20 so that the fluidized dispersion will have a density in the range from about 15 to about 320 kilograms per cubic meter. Fluidizing velocity may be in the range from about 3.0 to about 30 meters per second. This cracking process is preferably effected in a vertical transfer line reactor wherein the ratio of length to average diameter is at least about 25.

A suitable hydrocarbon feedstock for use in a fluidized catalytic cracking process in accordance with this invention can contain from about 0.2 to about 6.0 weight percent of sulfur in the form of organic sulfur compounds. Advantageously, the feedstock contains from about 0.5 to about 5 weight percent sulfur and more advantageously contains from about 1 to about 4 weight percent sulfur wherein the sulfur is present in the form of organic sulfur compounds. Suitable feedstocks include, but are not limited to, sulfur-containing petroleum fractions such as light gas oils, heavy gas oils, wide-cut gas oils, vacuum gas oils, naphthas, decanted oils, residual fractions and cycle oils derived from any of these as well as sulfur-containing hydrocarbon fractions derived from shale oils, tar sands processing, synthetic oils, coal liquefaction and the like. Any of these suitable feedstocks can be employed either singly or in any desired combination.

With respect to the effective use of this invention in a fluidized catalytic cracking process, the stripped deactivated cracking catalyst in association with the rare earth metal-inorganic oxide absorbent is regenerated in the regeneration zone and the sulfur oxides produced by combustion of the sulfur-containing coke are absorbed by the absorbent. The hydrocarbon feedstock is then cracked in the presence of the regenerated cracking catalyst in association with the rare earth metal-inorganic oxide absorbent containing absorbed sulfur oxides. During the catalytic conversion of the hydrocarbon feedstock, the absorbed sulfur oxides are substantially released from the absorbent as a sulfur-containing gas comprising hydrogen sulfide. The deactivated cracking catalyst in association with the rare earth metal-inorganic oxide absorbent is then stripped with a steam containing stripping gas prior to recycle to the regeneration zone. This steam stripping serves not only to remove volatile hydrocarbon deposits, but also serves to complete the removal of any residual absorbed sulfur oxides from the absorbent as a sulfur-containing gas which comprises hydrogen sulfide and completes the reactivation of the absorbent for further absorption of sulur oxides in the regeneration zone. The resulting hydrogen sulfide is recovered together with the other volatile products from the reaction and stripping zones and is separated and can be converted to elemental sulfur in facilities which are conventionally associated with a fluidized catalytic cracking unit.

When the process of this invention is employed in a fluidized catalytic cracking process, the regeneration zone effluent gases desirably contain at least about 0.01 volume percent, preferably at least about 0.5 volume percent, more preferably at least about 1.0 volume percent and ideally at least about 2.0 volume percent of molecular oxygen. In addition, the combination of rare earth metal or metals and inorganic oxide or oxides is preferably used in sufficient amount to effect the absorption of at least about 50%, more preferably at least about 80% and ideally more than about 90% of the sulfur oxides produced in the regeneration zone by the combustion of coke. As a result, the concentration of sulfur oxides in the regeneration zone effluent gas stream can be maintained at less than about 600 parts per million by volume (ppmv), advantageously less than about 200 ppmv and more advantageously at less than about 100 ppmv. In conventional fluidized catalytic cracking processes which do not employ the process of this invention, the cracking of high-sulfur feedstocks often results in the formation of a regeneration zone effluent gas stream which contains 1200 ppmv or more of sulfur oxides.

This invention is highly suitable for use in reducing emissions of sulfur oxides from the regenerator of a fluidized catalytic cracking unit since the rare earth metals and inorganic oxides of the invention have little or no adverse effect on the yield of desirable low molecular weight hydrocarbon products from hydrocarbon cracking.

With further reference to the use of this invention to reduce regeneration zone sulfur oxide emissions in a fluidized catalytic cracking process, the rare earth metal or metals and/or inorganic oxide or oxides can be deposited on a suitable support by introducing one or more compounds of the desired rare earth metal or metals and/or one or more precursors of the inorganic oxide or oxides into the fluidized catalytic cracking process cycle and thereby depositing the rare earth metal or metals and/or inorganic oxide or oxides onto the support in situ. In this embodiment, the support will comprise cracking catalyst. The rare earth metal compound or inorganic oxide precursor can be introduced as an aqueous or organic solution or dispersion, or in the solid, liquid or gaseous state at any stage of the cracking process cycle which comprises the cracking reaction zone, the stripping zone and the regeneration zone. For example, such compound or precursor can be admixed either with the feedstock or fluidizing gas in the reaction zone, with the regeneration gas, torch oil or water in the regeneration zone, or with the stripping gas in the stripping zone, or can be introduced as a separate stream. Suitable compounds or precursors for in situ incorporation include, but are not limited to, inorganic metal salts such as nitrates and carbonates, organometallic compounds, metal diketonates, and metal carboxylates of from 1 to 20 carbon atoms.

A particularly suitable embodiment of the invention for use in a fluidized catalytic cracking process involves the circulation through the process cycle in admixture with the cracking catalyst of a particulate solid other than cracking catalyst which comprises at least one inorganic oxide selected from the group consisting of the oxides of aluminum, magnesium, zinc, titanium and calcium in association with at least one free or combined rare earth metal selected from the group consisting of lanthanum, cerium, praseodymium, samarium and dysprosium; wherein the ratio by weight of inorganic oxide or oxides to rare earth metal or metals is preferably from about 1.0 to about 1,000, more preferably from about 2.0 to about 100, and most preferably from about 3.0 to about 20; and wherein the particulate solid other than cracking catalyst preferably contains at least about 40 weight percent and more preferably at least about 60 weight percent of the inorganic oxide or oxides. In a particularly preferred version of this embodiment, the particles other than cracking catalyst comprise a fluidizable high surface area particulate alumina upon or into which the rare earth metal or metals are deposited or incorporated. The particulate composition formed by mixing the cracking catalyst and particulate solid other than cracking catalyst comprises an amount of cracking catalyst which is desirably from about 50 to about 99.9 weight percent, preferably from about 70 to about 99.5 weight percent, and more preferably from about 90 to about 99.5 weight percent based on the total mixture. Conversely, the composition comprises an amount of particulate solid other than cracking catalyst which is desirably from about 0.1 to about 50 weight percent, preferably from about 0.5 to about 30 weight percent, and more preferably from about 0.5 to about 10 weight percent based on the total mixture.

Another embodiment of the invention for use in a fluidized catalytic cracking process involves the circulation through the process cycle in admixture with the particulate cracking catalyst of (a) a first particulate solid other than cracking catalyst which comprises at least about 50 weight percent of one or more inorganic oxides selected from the group consisting of the oxides of aluminum, magnesium, zinc, titanium and calcium and (b) a second particulate solid other than cracking catalyst which comprises at least one free or combined rare earth metal selected from the group consisting of lanthanum, cerium, praseodymium, samarium and dysprosium. In this embodiment, the ratio by weight of the inorganic oxide or oxides of the first particulate solid to the rare earth metal or metals of the second particulate solid is preferably from about 1.0 to about 1,000 and more preferably from about 2.0 to about 100. In addition, the composition formed by mixing the cracking catalyst and particulate solids other than cracking catalyst comprises an amount of cracking catalyst which is desirably from about 50 to about 99.9 weight percent, preferably from about 70 to about 99.5 weight percent, and most preferably from about 90 to about 99.5 weight percent based on the total mixture. Particulate cerium oxide, lanthanum oxide and mixtures of rare earth oxides comprising cerium and/or lanthanum are highly suitable for use as the second particulate solid other than cracking catalyst. Particulate alumina, especially gamma-alumina, and particulate solids comprising alumina are highly suitable for use as the first particulate solid other than cracking catalyst.

Another particularly suitable embodiment of the invention for use in a fluidized catalytic cracking process involves the use of a cracking catalyst in the process which is prepared by the steps comprising (a) impregnating a particulate solid cracking catalyst comprising from about 0.5 to about 50 weight percent of a crystalline aluminosilicate zeolite distributed throughout a porous matrix comprised of from about 40 to about 100 weight percent of alumina and from about 0 to about 60 weight percent of silica with at least one rare earth metal compound selected from the group consisting of the compounds of lanthanum, cerium, praseodymium, samarium and dysprosium, wherein the amount of said rare earth metal compound or compounds is sufficient to add from about 0.004 to about 10 weight percent rare earth metal or metals, calculated as the metal or metals, to the particles of cracking catalyst and (b) calcining the impregnated catalyst particles of a temperature between about 200° and about 820° C. Preferably, the catalyst matrix has a high alumina content and comprises in excess of about 50 weight percent, more preferably in excess of about 60 weight percent, and ideally in excess of about 70 weight percent of alumina. The particulate cracking catalyst is preferably impregnated with sufficient rare earth metal compound or compounds to add from about 0.1 to about 5 weight percent rare earth metal or metals, calculated as the metal or metals, to said catalyst particles. Cerium and lanthanum compounds are preferred for use in impregnating the cracking catalyst. Unexpectedly, the use of ceric compounds for impregnation affords a composition which is far more active for the absorption of sulfur oxides than does the use of cerous compounds. The rare earth metal or metals added by impregnation are in addition to any rare earth metal or metals which may be present in the crystalline aluminosilicate zeolite as a consequence of ion exchange with rare earth metals.

The following examples are intended only to illustrate the invention and are not to be construed as imposing limitations on the invention.

EXAMPLE 1

A particulate alpha alumina monohydrate (CATAPAL-SB, obtained from the Conoco Chemicals Division of Continental Oil Company) analyzing for 74.2% $Al_2O_3$, 0.008% $SiO_2$, 0.005% $Fe_2O_3$, 0.004% $Na_2O$ and less than 0.01% sulfur, having a bulk density in the range from 660 to 740 grams per liter, and with 78% by weight of the particles having a size less than 90 microns, was dried at 220° C. for 3 hours and then calcined at 650° C. for 3 hours to afford a particulate gamma-alumina having a water porosity of 1.32 grams of water per gram. Nine hundred grams of this gamma-alumina was impregnated with an aqueous solution prepared by dissolving 391.3 grams of ceric ammonium nitrate [$Ce(NH_4)_2(NO_3)_6$] in sufficient distilled water at room temperature to give 1200 milliliters of solution. The impregnated gamma-alumina was then dried at 120° C. overnight and calcined at 650° C. for 3 hours to give a particulate gamma-alumina having 10.0 weight percent of cerium deposited thereupon, with an attrition rate of 6.31% and a particle size distribution as follows: 23% greater than 80 microns, 25.2% from 20 to 40 microns and 3.8% fines.

EXAMPLE 2

A particulate alpha alumina monohydrate (CATAPAL-SB obtained from the Conoco Chemicals Division of Continental Oil Company) having the properties described in Example 1 was calcined at 540° C. for 3 hours to produce a particulate gamma-alumina. A solution of 7.1 grams of cerous nitrate [$Ce(NO_3)_3.6H_2O$] in 25 milliliters of water was then used to impregnate 20.6 grams of the particulate gamma-alumina. The impregnated alumina was then dried at 120° C. and calcined at 540° C. for 3 hours to give a particulate alumina which contained 10.0 weight percent of cerium.

EXAMPLE 3

The procedure of Example 2 was repeated, except that a solution of 8.3 grams of lanthanum nitrate [$La(NO_3)_3.5H_2O$] in 30 milliliters of water was used to impregnate 25.0 grams of the particulate gamma-alumina. The impregnated alumina was dried and calcined as in Example 2 to afford a particulate alumina which contained 10.0 weight percent of lanthanum.

EXAMPLE 4

The procedure of Example 2 was repeated, except that a solution of 8.5 grams of neodymium nitrate [$Nd(NO_3)_3.6H_2O$] in 30 milliliters of water was used to impregnate 25.3 grams of the particulate gamma-alumina. The impregnated alumina was dried and calcined as in Example 2 to afford a particulate alumina which contained 10.0 weight percent of neodymium.

EXAMPLE 5

The procedure of Example 2 was repeated, except that a solution of 7.6 grams of dysprosium nitrate [$Dy(NO_3)_3.5H_2O$] in 30 milliliters of water was used to impregnate 25.2 grams of the particulate gamma-alumina. The impregnated alumina was dried and calcined as in Example 2 to afford a particulate alumina which contained 10.0 weight percent of dysprosium.

EXAMPLE 6

The procedure of Example 2 was repeated, except that a solution of 8.7 grams of praseodymium nitrate [$Pr(NO_3)_3.6H_2O$] in 30 milliliters of water was used to impregnate 25.3 grams of the particulate gamma-alumina. The impregnated alumina was dried and calcined as in Example 2 to afford a particulate alumina which contained 10.0 weight percent of praseodymium.

EXAMPLE 7

The procedure of Example 2 was repeated, except that 25.1 grams of the particulate gamma-alumina was impregnated with a solution prepared by dissolving 3.3 grams of mixed rare earth oxides (48% cerium, 20% lanthanum, 13% neodymium, 5% praseodymium and 14% others) in 10 milliliters of concentrated nitric acid followed by diluting with 15 milliliters of water and 5 milliliters of 30% hydrogen peroxide. Enough additional water was then added to just cover the alumina. The impregnated alumina was dried and calcined as in Example 2 to afford a particulate alumina which contained 10 weight percent of mixed rare earth metals.

EXAMPLE 8

The procedure of Example 2 was repeated, except that a solution of 8.2 grams of samarium nitrate [$Sm(NO_3)_3.6H_2O$] in 30 milliliters of water was used to impregnate 25.1 grams of the particulate gamma-alumina. The impregnated alumina was dried and calcined as in Example 2 to afford a particulate alumina which contained 10.0 weight percent of samarium.

EXAMPLE 9

The procedure of Example 2 was repeated, except that a solution of 8.1 grams of gadolinium nitrate [$Gd(NO_3)_3.6H_2O$] in 30 milliliters of water was used to impregnate 25.3 grams of the particulate gamma-alumina. The impregnated alumina was dried and calcined as in Example 2 to afford a particulate alumina which contained 10.0 weight percent of gadolinium.

EXAMPLE 10

A mixture of 50 grams of magnesium oxide, 40 grams of alpha alumina monohydrate and 10 grams of calcium oxide was kneaded with 100 milliliters of 10% nitric acid. The resulting mixture was dried at 120° C., calcined first at 540° C. for 3 hours and finally calcined at 1200° C. for an additional 3 hours to afford a particulate solid comprised of MgO, $Ca_3Al_{10}O_{18}$ and $MgAl_2O_4$. A solution of 3.9 grams of ceric ammonium nitrate [$Ce(NH_4)_2(NO_3)_6$] in about 15 milliliters of methanol was then used to impregnate 9.0 grams of the particulate solid. Excess methanol was evaporated and the impregnated solid then dried at 120° C. and calcined at 540° C. for 3 hours to give a particulate solid containing magnesium, aluminum and calcium oxides which also contained 10.0 weight percent of cerium.

EXAMPLE 11

A silica-alumina composite (obtained from American Cyanamide Co.) was dried at 120° C., calcined at 650° C. for 3 hours, ground, and passed through a 100 mesh sieve to afford a particulate solid analyzing for 70.0% $SiO_2$ and 20.7% $Al_2O_3$ which had a surface area of 516 square meters per gram. A solution of 11.0 grams of ceric ammonium nitrate [Ce(NH$_4$)$_2$(NO$_3$)$_6$] in water was then used to impregnate 25.2 grams of the particulate silica-alumina. The impregnated silica-alumina was dried at 120° C. and calcined at 540° C. for 3 hours to give a particulate silica-alumina which contained 10.0 weight percent of cerium.

EXAMPLE 12

A solution of 22.2 grams of zinc nitrate [Zn(NO$_3$)$_2$.6H$_2$O ] in 500 milliliters of water was mixed with 542 grams of an alumina hydrosol (analyzing for 9.5% Al$_2$O$_3$ and obtained from American Cyanamide Co.) in a Waring blender and gelled by addition of 25 milliliters of concentrated ammonium hydroxide solution. The gel was dried overnight at 120° C., calcined at 540° C. and ground to pass through a 100 mesh sieve. A solution of 11.3 grams of ceric ammonium nitrate [Ce(NH$_4$)$_2$(NO$_3$)$_6$] in 20 milliliters of water was then used to impregnate 25.9 grams of the particulate solid. The impregnated solid was dried at 120° C. and calcined 540° C. for 3 hours to give a particulate solid containing aluminum and zinc oxides which also contained 10.0 weight percent of cerium.

EXAMPLE 13

A solution of 4.35 grams of ceric ammonium nitrate [Ce(NH$_4$)$_2$(NO$_3$)$_6$] in about 10 milliliters of water was used to impregnate 10.0 grams of particulate rutile (TiO$_2$). The impregnated rutile was dried at 120° C. and calcined at 540° C. for 3 hours to give a particulate titanium dioxide which also contained 10.0 weight percent of cerium.

EXAMPLE 14

A particulate silica (Grade 62, obtained from Davison Chemical Division, W. R. Grace & Co.) having a per volume of 1.15 milliliters per gram, a surface area of 340 square meters per gram, a bulk density of 400 kilograms per cubic meter, and a nominal 60-200 mesh size was dried at 120° C., calcined at 540° C. for 3 hours, and ground to pass through a 100 mesh sieve. A solution of 11.0 grams of ceric ammonium nitrate [Ce(NH$_4$)$_2$(NO$_3$)$_6$9 in water was then used to impregnate 25.2 grams of the calcined and ground silica. The impregnated silica was dried at 120° C. and calcined at 540° C. for 3 hours to give a particulate silica which contained 10.0 weight percent of cerium.

EXAMPLE 15

A solution of 4.35 grams of ceric ammonium nitrate [Ce(NH$_4$)$_2$(NO$_3$)$_6$] in about 10 milliliters of water was used to impregnate 10.0 grams of particulate anatase (TiO$_2$). The impregnated anatase was dried at 120° C. and calcined at 540° C. for 3 hours to give a particulate titanium dioxide which also contained 10.0 weight percent of cerium.

EXAMPLE 16

A solution of 11.2 grams of ceric ammonium nitrate [Ce(NH$_4$)$_2$(NO$_3$)$_6$] in 25 milliliters of water was used to impregnate 25.7 grams of equilibrium HEZ-55 particulate cracking catalyst (Houdry Division of Air Products and Chemicals, Inc.) analyzing for 60% Al$_2$O$_3$ and 35% SiO$_2$, and containing a rare earth ion exchanged Y-type zeolite in a silica-alumina matrix. The impregnated cracking catalyst was dried at 120° C. and calcined at 540° C. for 3 hours to give a particulate cracking catalyst which contained 10.0 weight percent of cerium deposited thereupon.

EXAMPLE 17

Commercially available particulate low surface area alpha-alumina was impregnated with an aqueous solution of magnesium nitrate in four successive steps to give a particulate solid containing 10 to 14 weight percent of magnesium. In a fifth step, the solid was impregnated with sufficient ceric ammonium nitrate [Ce(NH$_4$)$_2$(NO$_3$)$_6$] in methanol to give, after drying and calcination at 540° C., a particulate alumina upon which magnesium oxide (10-14 weight percent magnesium) and 10% cerium were deposited.

EXAMPLE 18

A solution of 0.0093 grams of cerous nitrate [Ce(NO$_3$)$_3$.6H$_2$O] in 20 milliliters of water was used to impregnate 20.0 grams of HFZ-20 particulate cracking catalyst (Houdry Division of Air Products and Chemicals, Inc.) analyzing for 59.4% Al$_2$O$_3$, 36.1% SiO$_2$ and 0.97% Na$_2$O, having a surface area of about 390 square meters per gram and containing about 20 to about 25 weight percent hydrogen Y-zeolite. The impregnated cracking catalyst was dried at 120° C. and calcined at 540° C. for 3 hours to give an HFZ-20 catalyst having 150 parts per million by weight of cerium deposited on its surface by way of a Ce(III) salt.

EXAMPLE 19

A 25.0 gram sample of the HFZ-20 cracking catalyst described in Example 18 was impregnated with a solution of 0.0195 grams of ceric ammonium nitrate [Ce(NH$_4$)$_2$(NO$_3$)$_6$] in 22.5 milliliters of water. The impregnated cracking catalyst was dried at 120° C. and calcined at 540° C. for 3 hours to give an HFZ-20 catalyst having 148 parts per million by weight of cerium deposited on its surface by way of a Ce(IV) salt.

EXAMPLE 20

The ability of various compositions to absorb sulfur dioxide from a gas stream was measured using the following procedure. A 1.00 gram sample of the composition was placed on top of a plug of glass wool in a quartz sample tube having a diameter of 1.3 centimeters and a length of 41 centimeters. The sample tube was then placed in a tube furnace and heated to the desired temperature while a purge gas composed of about 2.6 volume percent water vapor in helium was passed downward through the sample bed at a flow rate of 10 cubic centimeters per minute. After a 1 hour purge, a synthetic gas composed of 0.10 volume percent sulfur dioxide, 2.9 volume percent oxygen, 2.6 volume percent water vapor and the remainder being helium, was passed downward through the sample bed at a rate of 10 cubic centimeters per minute. After passage through the sample bed, the gas stream was periodically sampled and the samples analyzed with a gas chromatograph for sulfur dioxide content. Upon completion of a test, and without altering the gas flow rate, the test sample was removed from the sample tube. After a purge of 15 to 20 minutes, the effluent gas from the empty sample tube was sampled at the same intervals as for the test sample and analyzed in the same manner. The amount of sulfur dioxide absorbed by the test sample was then calculated by comparing the amount of sulfur dioxide in the effluent from the test sample at a given time with the amount of sulfur dioxide from the empty sample tube.

Test samples were prepared by mixing 1 part by weight of an additive with 99 parts by weight of CBZ-1 particulate cracking catalyst (Davison Chemical Division, W. R. Grace & Co.) analyzing for 29.1% $Al_2O_3$, 0.46% $Na_2O$ and 0.11% Fe, and containing a Y-zeolite. Both the additive and the CBZ-1 cracking catalyst were steamed at 760° C. (100% steam at atmospheric pressure) for 5 hours prior to mixing. The various additives are set forth in Table 1, and the test results are set forth in FIGS. 1–5, as indicated in Table 1. The test samples were all evaluated at 675° C.

Figure 2:
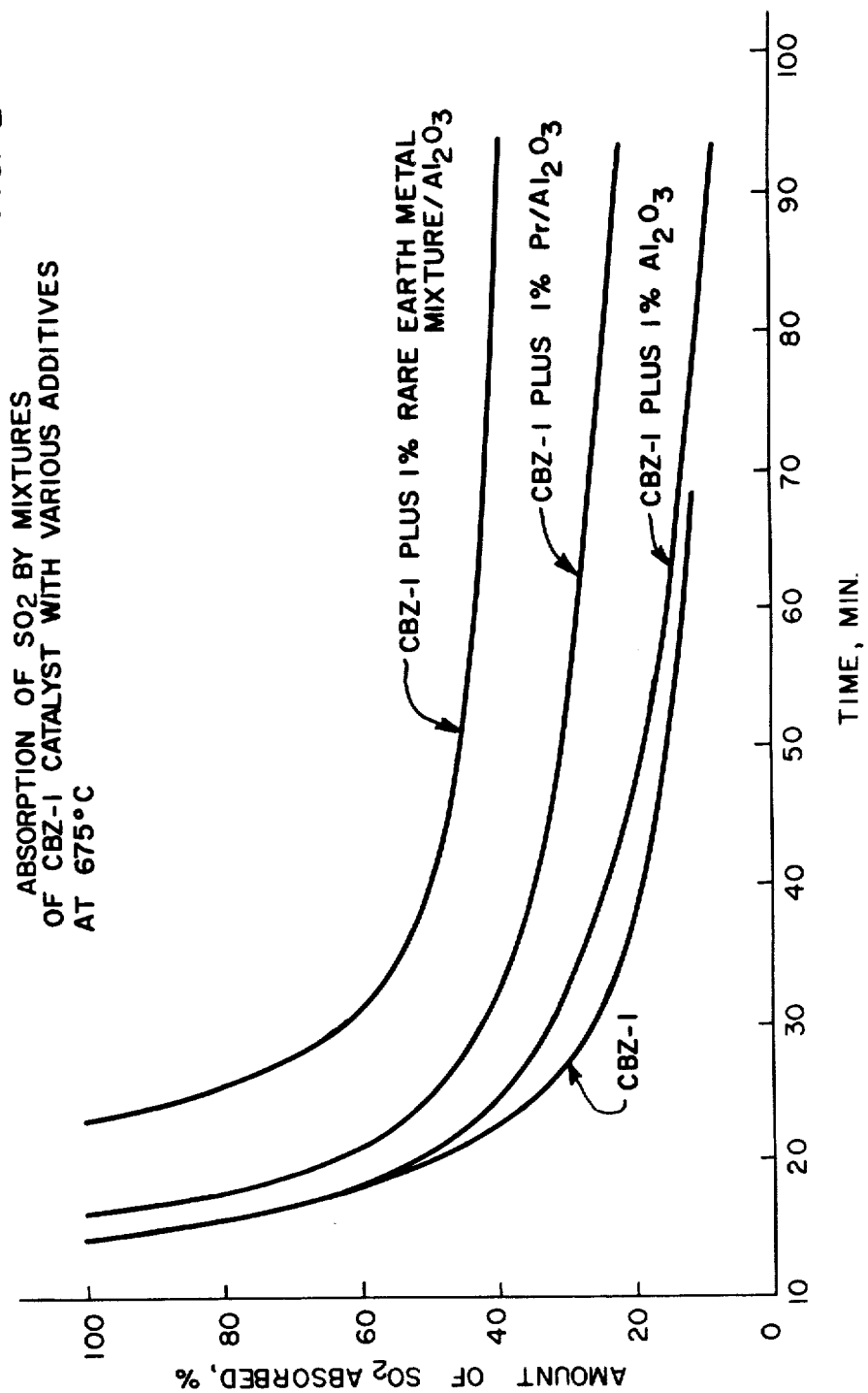

FIGS. 1–5 plot the ability of each test sample to absorb sulfur dioxide from the gas stream as a function of time, and the area under each curve is a measure of the total amount of sulfur dioxide absorbed. FIGS. 1–4 (Run No. 1 of Table 1) demonstrate that CBZ-1 catalyst alone is a poor sulfur oxide absorbent. FIG. 2 (Run No. 8 of Table 1) demonstrates that the addition of 1% by weight of gamma-alumina to CBZ-1 catalyst causes very little improvement in its ability to absorb sulfur dioxide. Similarly, FIG. 5 (Run No. 15 of Table 1) demonstrates that 1% of an additive composed of cerium on silica has little effect on the ability of CBZ-1 catalyst to absorb sulfur dioxide. FIG. 1 (Run No. 4 of Table 1) and FIG. 3 (Run No. 10 of Table 1) demonstrate that neodymium and gadolinium in association with alumina do not significantly improve the ability of CBZ-1 catalyst to absorb sulfur dioxide, and these results show that not all of the rare earth metals are satisfactory for use in the practice of this invention. The remaining results which are set forth in FIGS. 1–5 demonstrate the marked ability of rare earth metals selected from the group consisting of lanthanum, cerium, praseodymium, samarium, dysprosium, and mixtures thereof when in association with one or more inorganic oxides selected from the group consisting of the oxides of aluminum, magnesium, zinc, titanium and calcium to improve the absorption of sulfur dioxide by CBZ-1 catalyst.

EXAMPLE 21

The ability of CBZ-1 particulate cracking catalyst (Davison Chemical Division, W. R. Grace & Co.) alone and in association with cerium and/or alumina to absorb sulfur dioxide at 750° C. was measured using the test procedure described in Example 20. In each case, the absorption experiments were carried out for a test period of 92 minutes. Except for particulate $CeO_2$, the additives, CBZ-1 and cerium modified CBZ-1 were separately steamed at 760° C. (100% steam at atmospheric pressure) for 5 hours prior to use. The results, which are set forth in Table 2, demonstrate that synergistically improved results are obtained by combining cerium with alumina. The combination of cerium with alumina results in a substantially greater absorption of sulfur dioxide than would be predicted on the basis of their individual abilities to absorb sulfur dioxide.

TABLE 1

Figure 3:
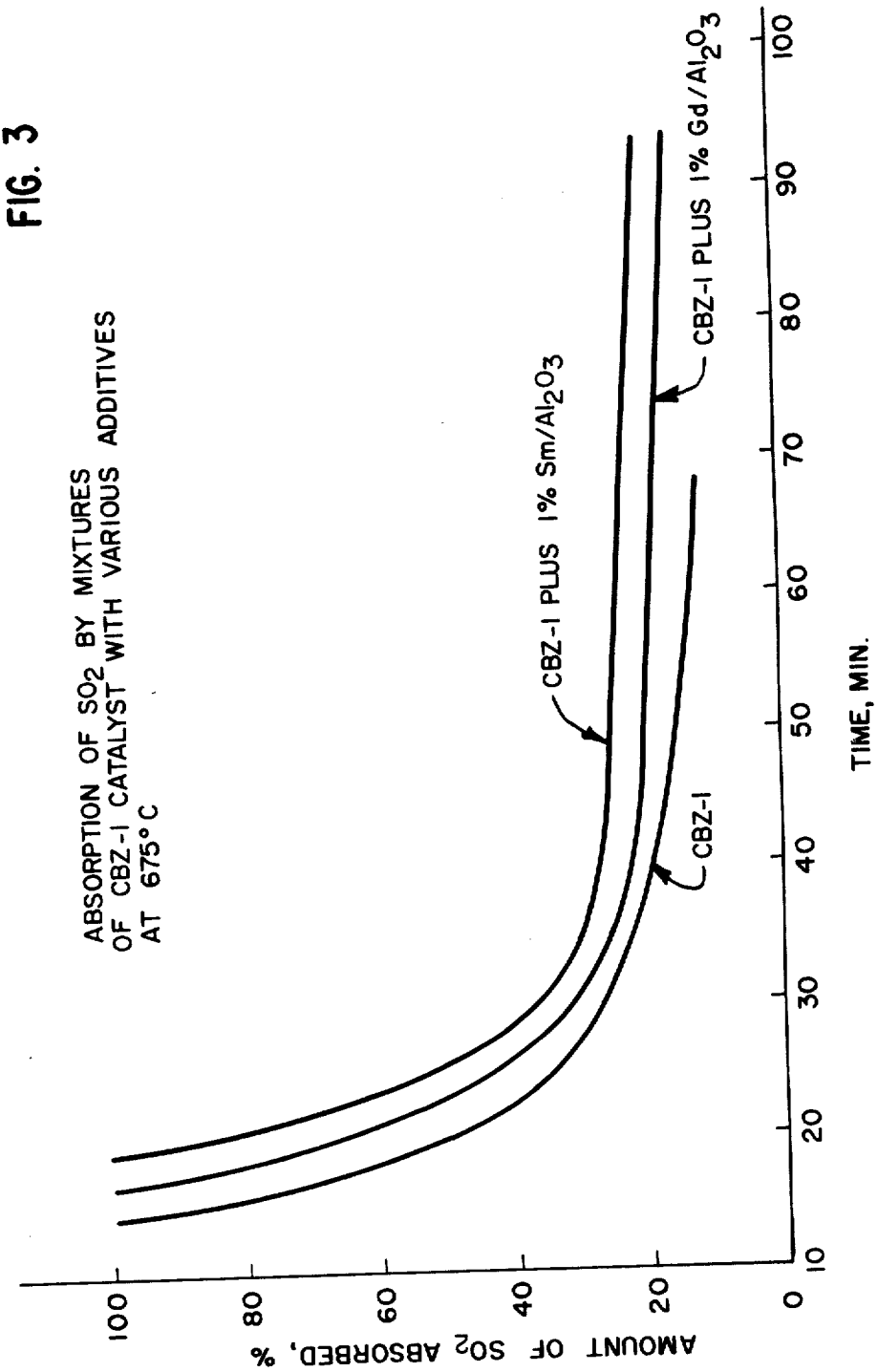
Figure 4:
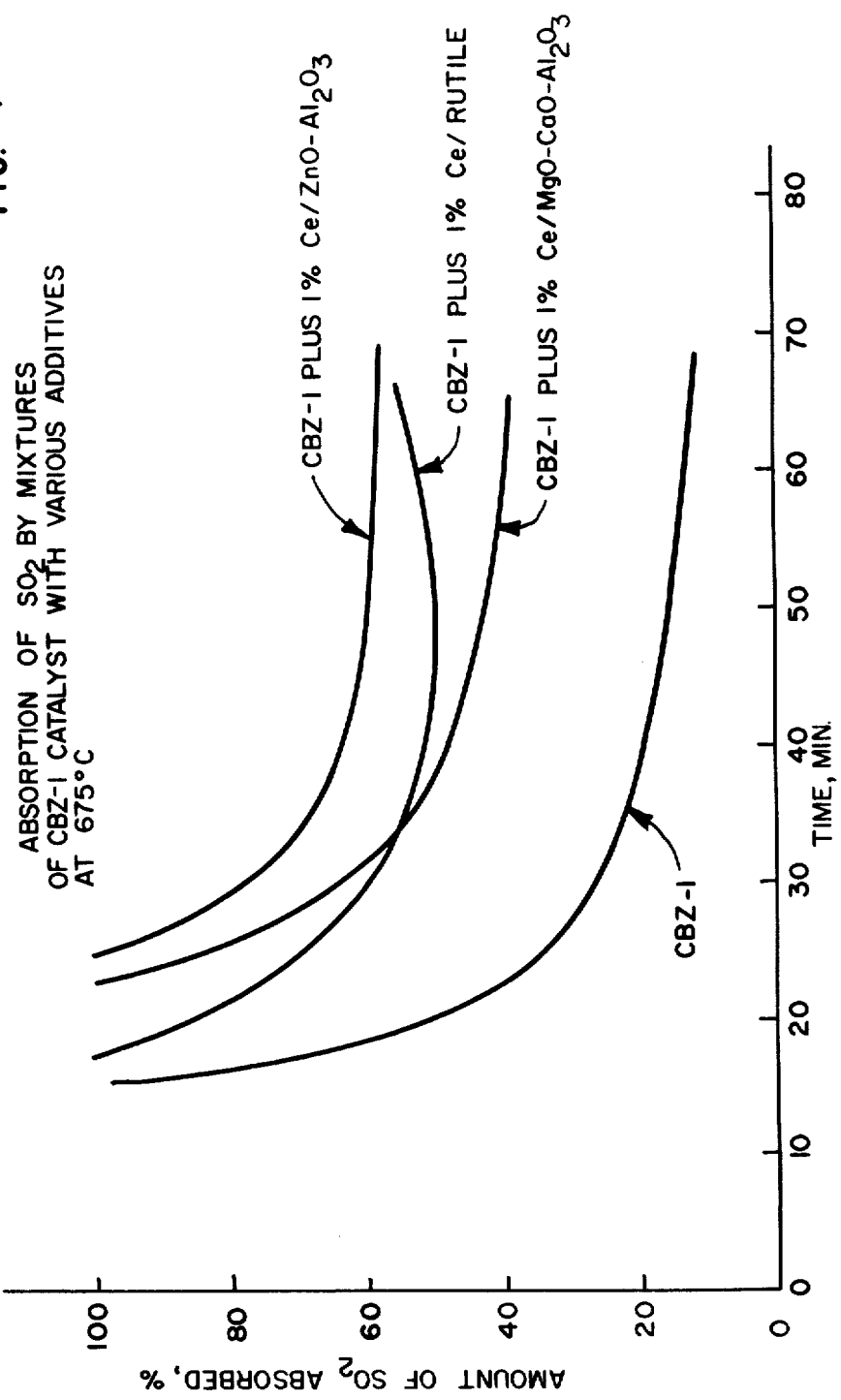
Figure 5:
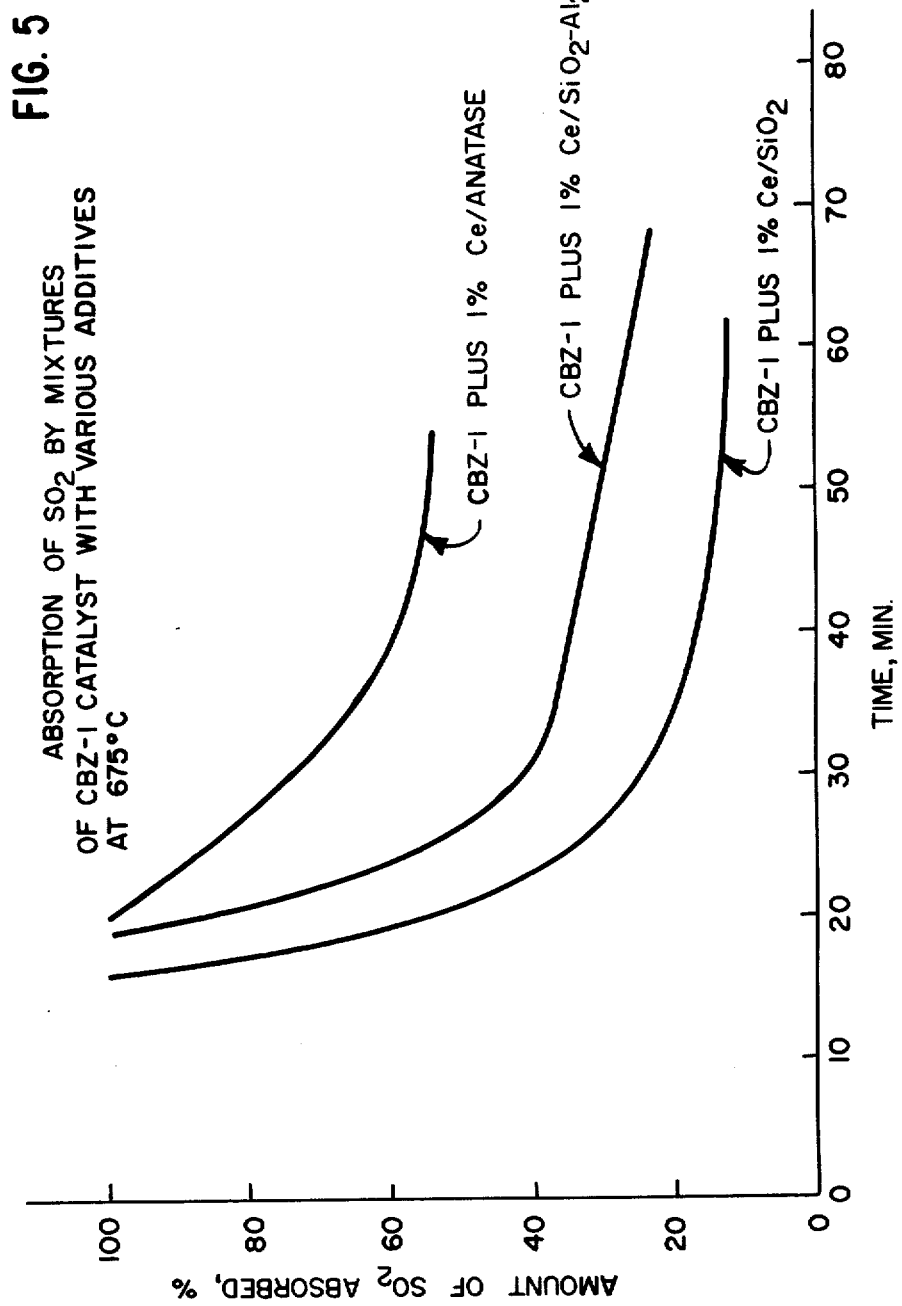

| Run No. | Additive Composition | Additive Preparation | Test Results |
|---|---|---|---|
| 1 | None (pure CBZ-1 employed) | — | FIG. 1–4 |
| 2 | 10.0% Ce on alumina | Example 2 | FIG. 1 |
| 3 | 10.0% La on alumina | Example 3 | FIG. 1 |
| 4 | 10.0% Nd on alumina | Example 4 | FIG. 1 |
| 5 | 10.0% Dy on alumina | Example 5 | FIG. 1 |
| 6 | 10.0% Pr on alumina | Example 6 | FIG. 2 |
| 7 | 10.0% mixed rare earth metals on alumina | Example 7 | FIG. 2 |
| 8 | gamma-alumina | Unimpregnated alumina of Example 2 | FIG. 2 |
| 9 | 10.0% Sm on alumina | Example 8 | FIG. 3 |
| 10 | 10.0% Gd on alumina | Example 9 | FIG. 3 |
| 11 | 10.0% Ce on MgO—CaO—$Al_2O_3$ | Example 10 | FIG. 4 |
| 12 | 10.0% Ce on rutile ($TiO_2$) | Example 11 | FIG. 4 |
| 13 | 10.0% Ce on ZnO—$Al_2O_3$ | Example 12 | FIG. 4 |
| 14 | 10.0% Ce on anatase ($TiO_2$) | Example 15 | FIG. 5 |
| 15 | 10.0% Ce on $SiO_2$ | Example 14 | FIG. 5 |

TABLE 2

| Run No. | Test Sample | Amount of $SO_2$ Absorbed, microliters[a] |
|---|---|---|
| 1 | CBZ-1 cracking catalyst | 385, 436 |
| 2 | 5 parts particulate gamma-$Al_2O_3$[b] mixed with 95 parts CBZ-1 cracking catalyst | 439 |
| 3 | 25 ppm Ce on CBZ-1 cracking catalyst[c] | 429 |
| 4 | CBZ-1 cracking catalyst mixed with 192 ppm of particulate $CeO_2$ | 339, 350 |
| 5 | 5 parts of particulate gamma-$Al_2O_3$ mixed with 95 parts of 25 ppm Ce on CBZ-1 cracking catalyst[c] | 512 |
| 6 | 5 parts of 500 ppm Ce on gamma-$Al_2O_3$[d] mixed with 95 parts of CBZ-1 cracking catalyst | 515 |
| 7 | CBZ-1 cracking catalyst mixed with 192 ppm of particulate $CeO_2$ and 5% gamma $Al_2O_3$[b] | 522 |

[a] One microliter at 20° C. is equal to $3.33 \times 10^{-6}$ grams of $SO_2$.
[b] Unimpregnated gamma-alumina of Example 2.
[c] Cerium was added to the CBZ-1 catalyst by impregnation with an aqueous solution of ceric ammonium nitrate followed by drying at 120° C. and calcination at 540° C. for 3 hours.
[d] Cerium was added to the unimpregnated gamma alumina of Example 2 by impregnation with an aqueous solution of ceric ammonium nitrate followed by drying at 120° C. and calcination at 540° C. for 3 hours.

EXAMPLE 22

The ability of HFZ-20 cracking catalyst to absorb sulfur dioxide, both before and after impregnation with about 150 ppm of cerium, was measured at 657° C. using the test procedure described in Example 20. The impregnated catalysts of Examples 18 and 19 were employed, which were prepared by impregnation of CBZ-1 catalyst with a Ce(III) salt and a Ce(IV) salt respectively. These results are set forth in FIG. 6 and serve to indicate that the use of a Ce(IV) salt affords a more active material than does the use of a Ce(III) salt.

EXAMPLE 23

The effect on the catalytic activity of CBZ-1 cracking catalyst (Davison Chemical Division, W. R. Grace & Co.) of the unimpregnated gamma-alumina of Example 1 and the 10.0% cerium on alumina prepared according to Example 1 was determined by measurement of the relative microactivity (RMA) and coke factor of CBZ-1 catalyst and of various mixtures of CBZ-1 catalyst with the alumina or cerium on alumina. The CBZ-1 catalyst and the additives were steamed at 760° C. (100% steam at atmospheric pressure) for 5 hours prior to use. The RMA is the ratio of the catalytic activity of a cracking catalyst to a standard cracking catalyst at constant severity and serves as a measure of the cracking activity of a catalyst. The coke factor is a measure of the tendency of a cracking catalyst to convert a hydrocarbon feedstock to coke, with a large coke factor indicating a tendency toward higher coke formation. The coke factor serves as a measure of the selectivity of a cracking catalyst. The results of these measurements are set forth in Table 3, and serve to demonstrate that the addition of particulate gamma-alumina to CBZ-1 cracking catalyst causes a significant reduction in its activity and selectivity. In distinct contrast, addition of the 10% cerium on alumina additive to CBZ-1 catalyst does not reduce the activity or selectivity of the catalyst and, indeed, effects a slight improvement in both RMA and coke factor.

TABLE 3

| Run No. | Catalyst Composition[a] | RMA | Coke Factor |
|---|---|---|---|
| 1 | CBZ-1 | 170.4 | 1.27 |
|   |   | 173 | 1.30 |
| 2 | 5 parts Al$_2$O$_3$ mixed with 95 parts CBZ-1 | 161.9 | 1.33 |
| 3 | 15 parts Al$_2$O$_3$ mixed with 85 parts CBZ-1 | 153.6 | 1.47 |
| 4 | 2 parts 10.0% Ce on Al$_2$O$_3$ mixed with 98 parts CBZ-1 | 179 | 1.14 |
| 5 | 5 parts 10.0% Ce on Al$_2$O$_3$ mixed with 95 parts CBZ-1 | 179 | 1.16 |
| 6 | 10 parts 10.0% Ce on Al$_2$O$_3$ mixed with 90 parts CBZ-1 | 165 | 1.31 |
| 7 | 15 parts 10.0% Ce on Al$_2$O$_3$ mixed with 85 parts CBZ-1 | 181 | 1.12 |

[a]Compositions are expressed in terms of parts by weight.

EXAMPLE 24

Pilot plant cyclic fluidized catalytic cracking tests were conducted with a wide boiling gas oil feedstock having a sulfur content of 1.33 weight percent and a nitrogen content of 0.0841 weight percent. Comparison tests were carried out using equilibrium CBZ-1 particulate cracking catalyst (Davison Chemical Division, W. R. Grace & Co.) and also using a mixture of 99 parts by weight of equilibrium CBZ-1 with 1 part by weight of the 10.0% cerium on alumina additive prepared according to Example 2. In addition, comparison tests were also carried out using equilibrium HFZ-33 particulate cracking catalyst (Houdry Division of Air Products and Chemicals, Inc.) analyzing for 59% Al$_2$O$_3$ and 37% SiO$_2$ and also using a mixture of 99 parts by weight of equilibrium HFZ-33 catalyst with 1 part by weight of the 10.0% cerium on alumina additive prepared according to Example 2. In each case, the cerium on alumina additive was steamed at 760° C. (100% steam at atmospheric pressure) for 5 hours prior to use. The cerium on alumina additive reduced sulfur oxide emissions in the regenerator flue gas from 894 to 397 parts per million by volume or 56% for CBZ-1 catalyst and from 270 to 129 parts per million by volume or 52% for HFZ-33 catalyst. The comparative data are set forth in Table 4.

EXAMPLE 25

Pilot plant cyclic fluidized catalytic cracking tests were conducted with a gas oil feedstock having a sulfur content of 2.50 weight percent and a nitrogen content of 0.102 weight percent. Comparison tests were carried out using equilibrium CBZ-1 particulate cracking catalyst (Davison Chemical Division, W. R. Grace & Co.) and also using a mixture of 99 parts by weight of equilibrium CBZ-1 catalyst with 1 part by weight of the 10.0% cerium on alumina additive prepared according to Example 2. The cerium on alumina additive as steamed at 760° C. (100% steam at atmospheric pressure) for 5 hours prior to use. The comparative data are set forth in Table 5. Conversion and product yields were essentially the same in both cases.

TABLE 4

|  | Test A | Test B | Test C | Test D |
|---|---|---|---|---|
| Catalyst: | CBZ-1 | CBZ-1 plus 1% additive | HFZ-33 | HFZ-33 plus 1% additive |
| Cracking Conditions: |  |  |  |  |
| Reactor Temp., °C. | 510 | 510 | 510 | 510 |
| Feed Rate, g./min. | 9 | 9 | 9 | 9 |
| Stripping Conditions: |  |  |  |  |
| Temp., °C. | 496 | 496 | 496 | 496 |
| Steam, g./hr. | 16 | 16 | 16 | 16 |
| Nitrogen, std. cu.m./hr. | 0.031 | 0.031 | 0.031 | 0.031 |
| Regeneration Conditions: |  |  |  |  |
| Temp., °C. | 649 | 649 | 649 | 649 |
| Flue Gas O$_2$ Conc., Vol. % | 2.0 | 2.0 | 2.0 | 2.0 |
| Flue Gas SO$_2$ Conc., ppmv[a] | 894 | 397 | 270 | 129 |
| Flue Gas Nitrogen Oxide Conc., ppmv | 8 | 6 | 34 | 29 |

[a]Net sulfur emitted to the atmosphere.

TABLE 5

|  | Test A | Test B |
|---|---|---|
| Catalyst: | CBZ-1 | CBZ-1 plus 1% additive |
| Cracking Conditions: |  |  |
| Feed rate, g./min. | 13 | 13 |
| Reactor Temp., °C. | 510 | 511 |
| Catalyst to Oil wt. ratio | 5.8 | 5.1 |
| WHSV | 17.6 | 17.2 |
| Stripping Conditions: |  |  |
| Temp., °C. | 496 | 496 |
| Nitrogen, std. cu.m./hr. | 0.031 | 0.031 |
| Regeneration Conditions: |  |  |
| Temp., °C. | 621 | 621 |
| Carbon on Regenerated Catalyst, wt. % | 0.082 | 0.068 |
| Flue Gas O$_2$ Conc., Vol. % | 2.0 | 2.0 |
| Products: |  |  |
| Conversion, vol. % | 70.63 | 69.72 |
| Yield (wt. %) |  |  |
| H$_2$S | 0.69 | 0.70 |
| C$_2$ and lighter | 1.51 | 1.58 |
| C$_3$ | 5.23 | 5.31 |
| C$_4$ | 9.40 | 9.39 |
| C$_5$ −221° C. | 47.22 | 45.93 |
| 221° C. + | 31.75 | 32.65 |
| Coke | 4.19 | 4.44 |

We claim:
1. A composition of matter prepared by the steps comprising:
(a) impregnating a particulate solid cracking catalyst comprising from about 0.5 to about 50 weight percent of a crystalline aluminosilicate zeolite distributed throughout a porous matrix with at least one rare earth metal compound selected from the group consisting of the compounds of lanthanum, cerium, praseodymium, samarium and dysprosium, wherein said matrix comprises from about 70 to about 100 weight percent alumina, and wherein the amount of said rare earth metal compound or compounds is sufficient to add from about 0.004 to about 10 weight percent of rare earth metal or metals, calculated as the metal or metals, to said particulate catalyst; and (b) calcining said impregnated particulate catalyst at a temperature between about 200° and about 820° C.

2. The composition as set forth in claim 1 wherein the amount of said rare earth metal compound or compounds is sufficient to add from about 0.1 to about 5 weight percent rare earth metal or metals, calculated as the metal or metals, to the catalyst particles.

3. The composition as set forth in claim 1 wherein said rare earth metal comprises lanthanum.

4. The composition as set forth in claim 1 wherein said rare earth metal comprises cerium.

5. The composition as set forth in claim 4 wherein a ceric compound is used to impregnate said cracking catalyst.

6. The composition as set forth in claim 5 wherein said ceric compound is ceric ammonium nitrate.

7. A composition of matter comprising a particulate physical mixture of:
(a) a particulate solid cracking catalyst for cracking hydrocarbons comprising a crystalline aluminosilicate zeolite distributed throughout a porous matrix wherein said matrix comprises from about 70 to about 100 weight percent of alumina; and
(b) a particulate solid other than said cracking catalyst comprising at least one inorganic oxide selected from the group consisting of the oxides of aluminum, magnesium, zinc, titanium and calcium in association with at least one free or combined rare earth metal selected from the group consisting of lanthanum, cerium, praseodymium, samarium, and dysprosium, wherein the particulate solid other than cracking catalyst contains at least about 40 weight percent of said inorganic oxide or oxides, the ratio by weight of inorganic oxide or oxides to rare earth metal or metals is from about 1.0 to about 1,000, and said particulate solid other than cracking catalyst comprises from about 0.1 to about 50 weight percent of said particulate physical mixture.

8. The composition as set forth in claim 7 wherein said rare earth metal comprises lanthanum.

9. The composition as set forth in claim 7 wherein said rare earth metal comprises cerium.

10. The composition as set forth in claim 7 wherein said inorganic oxide comprises alumina.

11. The composition as set forth in claim 10 wherein said alumina comprises gamma-alumina.

12. The composition as set forth in claim 7 wherein said inorganic oxide comprises alumina and said rare earth metal comprises cerium.

13. The composition as set forth in claim 7 wherein said inorganic oxide comprises a mixture of alumina and magnesium oxide, and the weight ratio of alumina to magnesium oxide is from about 2.0 to about 100.

14. The composition as set forth in claim 7 wherein the ratio by weight of inorganic oxide or oxides to rare earth metal or metals is from about 2.0 to about 100.

15. The composition as set forth in claim 7 wherein the ratio by weight of inorganic oxide or oxides to rare earth metal or metals is from about 3.0 to about 20.

16. The composition as set forth in claim 7 wherein the particulate solid other than cracking catalyst comprises from about 0.5 to about 10 weight percent of the particulate physical mixture.

17. A composition of matter comprising a particulate physical mixture of:
(a) a particulate solid cracking catalyst for cracking hydrocarbons comprising a crystalline aluminosilicate zeolite distributed throughout a porous matrix, wherein said matrix comprises from about 70 to about 100 weight percent of alumina, and the amount of said catalyst is from about 50 to about 99.9 weight percent of the particulate physical mixture;
(b) a first particulate solid other than said cracking catalyst comprising at least about 50 weight percent of one or more inorganic oxides selected from the group consisting of the oxides of aluminum, magnesium, zinc, titanium and calcium; and
(c) a second particulate solid other than said cracking catalyst comprising at least one free or combined rare earth metal selected from the group consisting of lanthanum, cerium, praseodymium, samarium and dysprosium, wherein the ratio by weight of the inorganic oxide or oxides of said first particulate solid to the rare earth metal or metals of said second particulate solid is from about 1.0 to about 1,000.

18. The composition as set forth in claim 17 wherein said first particulate solid other than cracking catalyst comprises a mixture of alumina and magnesium oxide, and the weight ratio of alumina to magnesium oxide is from about 2.0 to about 100.

19. The composition as set forth in claim 17 wherein said first particulate solid other than cracking catalyst comprises alumina.

20. The composition as set forth in claim 19 wherein said alumina is gamma-alumina.

21. The composition as set forth in claim 17 wherein said rare earth metal comprises lanthanum.

22. The composition as set forth in claim 17 wherein said rare earth metal comprises cerium.

23. The composition as set forth in claim 17 wherein said second particulate solid other than cracking catalyst comprises cerium oxide.

24. The composition as set forth in claim 17 wherein said second particulate solid other than cracking catalyst comprises lanthanum oxide.

25. The composition as set forth in claim 17 wherein said first particulate solid other than cracking catalyst comprises alumina and said rare earth metal comprises cerium.

26. The composition as set forth in claim 17 wherein the ratio by weight of the inorganic oxide or oxides of said first particulate solid to the rare earth metal or metals of said second particulate solid is from about 2.0 to about 100.

27. The composition as set forth in claim 17 wherein said cracking catalyst comprises from about 90 to about 99.5 weight percent of the particulate physical mixture.

28. The composition as set forth in claim 7 wherein said cracking catalyst comprises from about 0.5 to about 50 weight percent of a crystalline aluminosilicate zeolite.

29. The composition as set forth in claim 17 wherein said cracking catalyst comprises from about 0.5 to about 50 weight percent of a crystalline aluminosilicate zeolite.

* * * * *